INVENTOR.
JOHN V. BLANKENBAKER,
BY
Lester S. Hecht
HIS ATTORNEY.

Feb. 2, 1960 J. V. BLANKENBAKER 2,923,474
MULTIPLE INPUT BINARY-CODED DECIMAL
ADDERS AND SUBTRACTERS
Filed Sept. 2, 1953 4 Sheets-Sheet 2

JOHN V. BLANKENBAKER,
INVENTOR.

BY Henry Heyman
ATTORNEY.

JOHN V. BLANKENBAKER,
INVENTOR.

BY Henry Heyman
ATTORNEY.

JOHN V. BLANKENBAKER,
INVENTOR.

BY Henry Heyman
ATTORNEY.

United States Patent Office 2,923,474

Patented Feb. 2, 1960

2,923,474

MULTIPLE INPUT BINARY-CODED DECIMAL ADDERS AND SUBTRACTERS

John Virgil Blankenbaker, Los Angeles, Calif., assignor, by mesne assignments, to Hughes Aircraft Company, a corporation of Delaware Application September 2, 1953, Serial No. 378,116

13 Claims. (Cl. 235—170)

This invention relates to multiple input binary-coded decimal adders and subtracters and, more particularly, to electronic multiple input adders and subtracters wherein a single binary-coded decimal correction is performed upon signals representing the input variables.

The general principles of the design of binary-coded arithmetic units are described in at least two copending U.S. patent applications. In the first copending U.S. patent application, Serial No. 278,408, for "Arithmetic Units for Decimal-Coded Binary Computers," by Daniel L. Curtis, filed March 25, 1952, serial and parallel arithmetic units are considered, each of the several embodiments disclosed including a correction control network which produces a control signal when the true binary result is not in the desired binary-coded decimal form. A correction transfer circuit, responsive to the control signal, is utilized to correct the true binary result to the desired binary-coded decimal form when the necessity for a correction is indicated by the control signal.

In the second copending U.S. patent application, Serial No. 322,665, for "Serial Arithmetic Units for Binary-Coded Decimal Computers," by E. C. Nelson, filed November 26, 1952, issued February 18, 1958, as Patent No. 2,823,855; improved circuits for correcting the true binary result to the desired decimal result are disclosed. The feature of these circuits is that the true binary result is shifted and corrected in a single operation, making it possible to reduce the amount of storage capacity required to record the numbers as well as the amount of time required in adding or subtracting input numbers.

A class of correction circuits has been produced wherein the binary-coded decimal corrections are formed directly as a function of binary carry signals C and $\bar{C}$, and complementary comparison signals Q and $\bar{Q}$, where signal Q is defined as one having a 1-representing level when the carry signal is equal to the desired true binary result. In these circuits, the result-from-carry technique makes it possible to perform the binary-coded decimal correction on a time-sharing basis such that it is possible to considerably reduce the number of gating elements required.

Since each addition or subtraction of binary-coded decimal numbers in a two-input adder or subtracter of the type described in the above-mentioned copending applications requires a separate correction network, it is apparent that a multiple input adder including a plurality of two input adders requires a considerable number of correction flip-flops and corresponding gating circuits. For example, in order to add three binary-coded input signals simultaneously, the adder requires two 2-input binary-coded decimal adders and, consequently, four correction flip-flops as well as six flip-flops for the input signals and binary carries. In addition, if it is desired to obtain the simple gating circuit technique of the result-from-carry type of adder described above, two additional comparison flip-flops or, in any event, two buffer flip-flop stages are required. As a result of the number of series-connected flip-flops required, the summing process requires twice as long as the time required to sum two binary-coded decimal input numbers.

The present invention contemplates a multiple input adder or subtracter wherein the binary-coded decimal result is formed through a single correction circuit requiring only two flip-flops. In one embodiment of the present invention three binary-coded input signals are simultaneously added and then corrected in a single operation introducing a time delay of only 5 or 6 binary digit time intervals, the entire circuit requiring only 10 flip-flops or trigger circuits. A 3-input adder comprising two 2-input adders, on the other hand, requires 12 flip-flops, including two buffer or comparison stages, and introduces a time delay of 8 binary digit time intervals during operation.

The second copending application contains a considerable amount of description concerning the logical design of shifting and correcting networks either based upon a true binary result to decimal result conversion or upon a conversion made as a function of the binary carry series, and signals of a comparison flip-flop. Consequently, it is convenient to incorporate this application into the present specification by way of frequent reference. The second copending application is referred to as the above-mentioned copending application to E. C. Nelson.

In the ensuing description of the multiple-input binary-coded decimal adders and subtracters of the present invention, reference is frequently made to binary carry-over-one, binary carry-over-two, decimal carry-over-one, and decimal carry-over-two digit signals. For purposes of clarity in the ensuing description, these terms are herewith defined. A binary carry-over-one is a conventional binary carry and is herein defined as a unit carry-over to the next higher order binary digital place resulting from the performance of an arithmetic operation on the binary digits of a given binary digital place of two or more binary numbers. A binary carry-over-two is defined as a two-unit carry-over to the next higher order binary digital place resulting from the arithmetic operation on the binary digits in the given binary digital place of the binary numbers. A decimal carry-over-one and a decimal carry-over-two are defined as a unit carry-over and a two-unit carry-over, respectively, to the next higher order digital place in a decimal system resulting from the performance of an arithmetic operation on decimal digits in a given decimal digital place of two or more decimal numbers.

Accordingly it is an object of the present invention to provide a multiple input binary-coded decimal adder or subtracter requiring only a single correction circuit for converting the true binary result of an operation to the desired binary-coded decimal result.

Another object is to provide a multiple input binary-coded decimal input adder or subtracter for producing the desired decimal result in a single correction operation, thereby eliminating additional operating time for subsequent corrections.

Still another object is to provide a multiple input binary-coded decimal adder-subtracter requiring fewer flip-flop or trigger circuits than the equivalent adder-subtracter comprising a number of 2-input binary-coded decimal adder-subtracters.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figures 3, 3A:
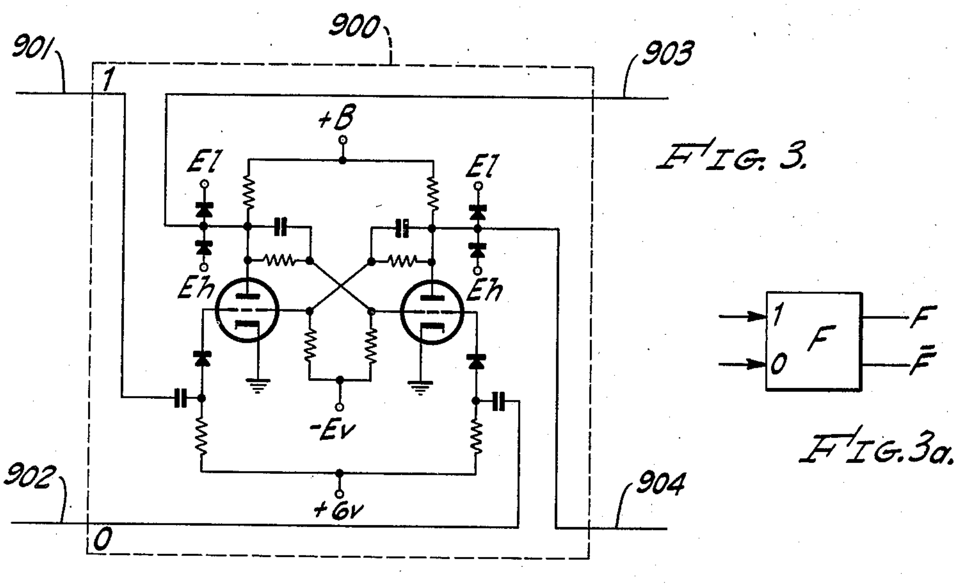

Figs. 3 and 3*a* present a schematic circuit diagram and a symbolic representation, respectively, of a typical flip-flop circuit suitable for use in the mechanization of the present invention.

Figure 4:
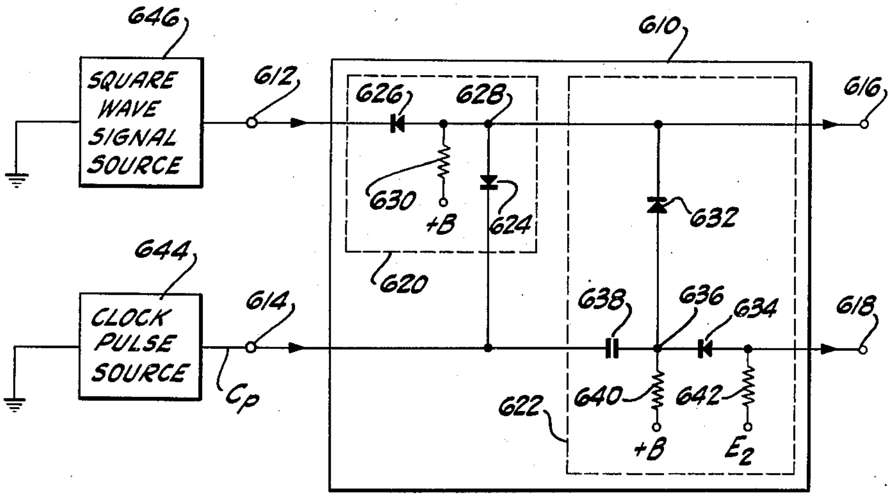
Figure 4A:
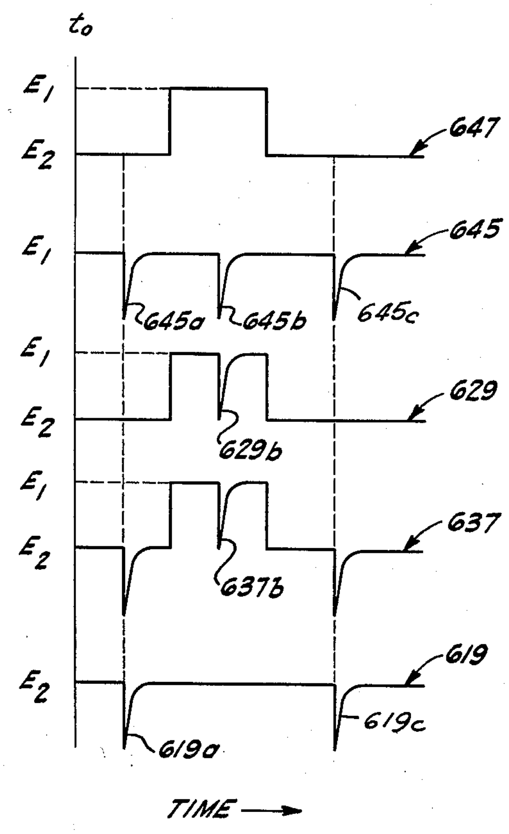

Figs. 4 and 4*a* present a schematic circuit diagram and a voltage waveform chart, respectively, of a typical complementer circuit suitable for use in the mechanization of the present invention.

Figure 5:
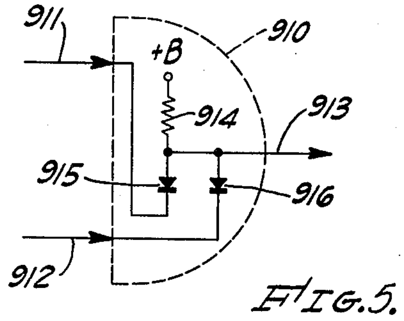
Figure 5A:
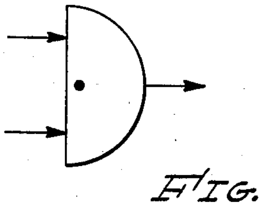

Figs. 5 and 5*a* present a schematic circuit diagram and a symbolic representation, respectively, of a typical logical "and" circuit suitable for use in the mechanization of the present invention.

Figure 6:
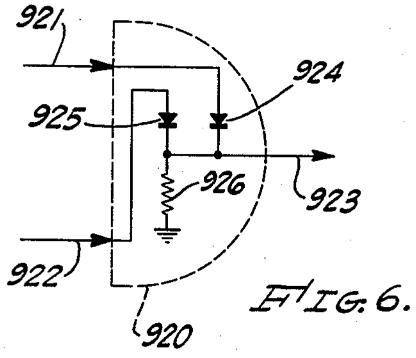
Figure 6A:
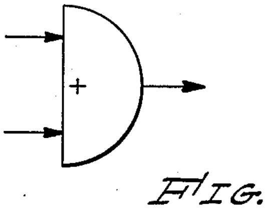

Figs. 6 and 6*a* present a schematic circuit diagram and a symbolic representation, respectively, of a typical logical "or" circuit suitable for use in the mechanization of the present invention.

Figure 1:
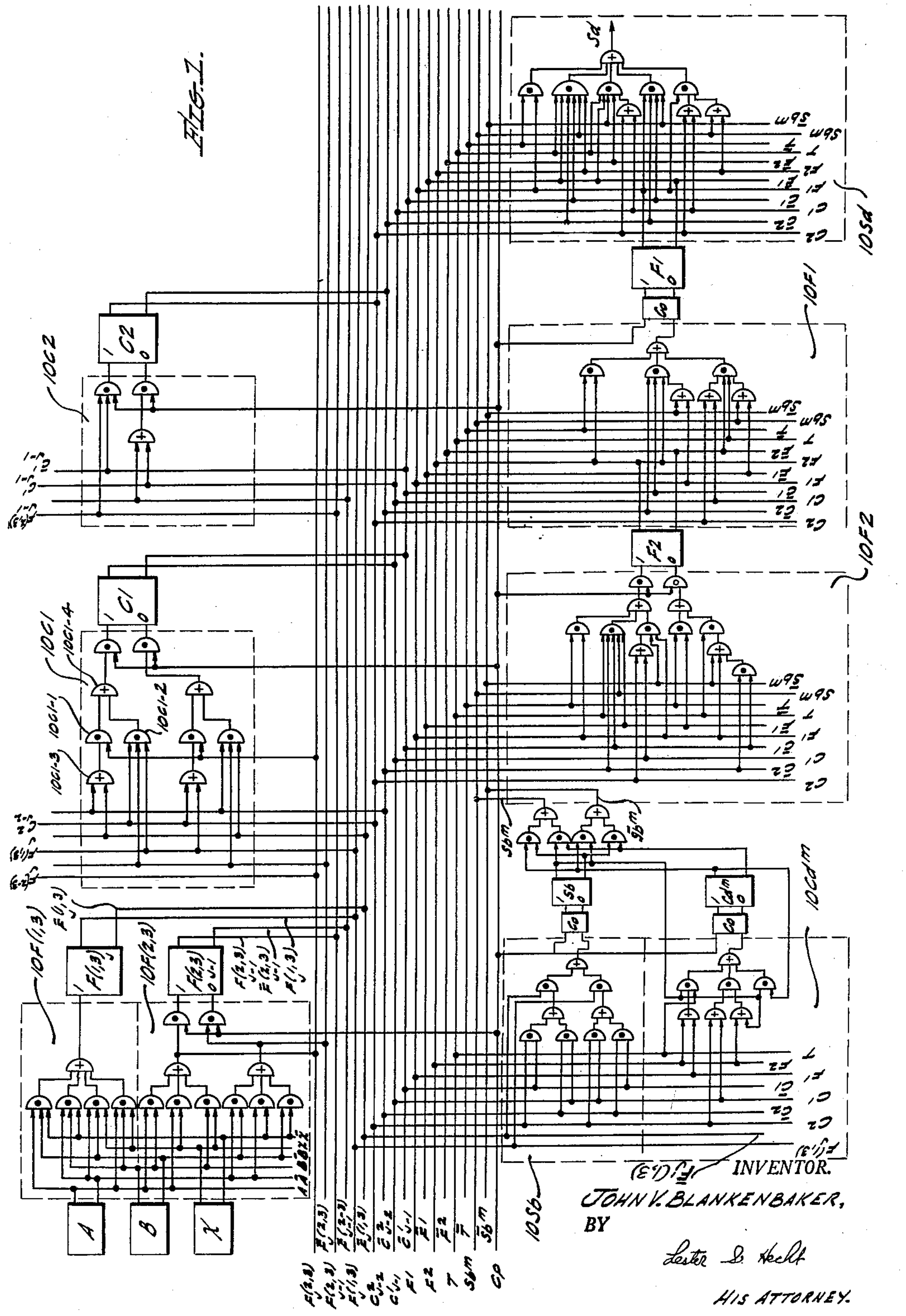
Fig. 1 is a schematic diagram of a 3-input binary-coded decimal adder according to the present invention wherein the true binary sum $Sb$ is produced as a function of carry signals $C^1$ and $C^2$, representing carries over one and two time intervals, respectively.

Reference is now made to Fig. 1 wherein there is presented a 3-input binary-coded decimal adder according to the present invention. As shown in Fig. 1, the 3-input adder is responsive to three pairs of complementary binary input signals A, $\bar{A}$; B, $\bar{B}$; and X, $\bar{X}$; produced by 3-input means A, B, and X, respectively, representing three binary-coded decimal input numbers, and is responsive to synchronizing or clock pulses $Cp$ and decimal correction timing signals T and $\bar{T}$ for producing binary output signals $Sd$ representing the arithmetic sum of the 3-input numbers in binary-coded decimal form.

A binary-coded decimal number is herein defined as a decimal number wherein each decimal digit is represented by a group of binary digits having pre-assigned weights. For example, in a conventional binary-coded decimal system, four binary digits are utilized to represent each decimal digit wherein the four binary digits have weights of 1, 2, 4, and 8 for the least, second-to-least, second-to-most, and most significant binary digit, respectively, representing each decimal digit. A true binary number, on the other hand, is herein defined in the conventional manner as a number comprised of a single group of binary digits, each binary digit having a weight twice the weight of the next lower order binary digit in the group with the least significant binary digit of the group having a weight of 1. Thus, by way of example, the decimal number 37 is expressed in the 1, 2, 4, 8 binary-coded decimal number system as two groups of four binary digits, thus: 0111 and 0011 representing the decimal digit 7 and 3, respectively; whereas in true binary form the number 37 is represented by a single group of binary digits thus 100101. Each of the above groups of binary digits is written in the order of most significant binary digit on the extreme left hand end of the group and progressively writing the binary digits of decreasing weight until the least significant binary digit, having a weight of 1 is written at the extreme right hand end of the group.

For purposes of illustrating the present invention, it is assumed that each of the three decimal input numbers represented by signals A, $\bar{A}$; B, $\bar{B}$; and X, $\bar{X}$; respectively, is coded in the conventional 1, 2, 4, 8 binary-coded decimal system above described. In addition, it is assumed that each input number is serially received in the order of least significant decimal digit first and most significant decimal digit last, and further that each decimal digit is represented by four binary digits received in the order of least significant binary digit first and most significant binary digit last. It is further assumed that each binary digit of a number is represented by a two-level or binary electrical signal having a relatively high signal value in representation of a binary 1 and a relatively low signal value in representation of a binary 0.

A bar (‾) over a signal indicates the complement of the signal.

Thus, input means A of Fig. 1 produces a relatively high or 1 level signal A and a relatively low or 0 level signal $\bar{A}$ in representation of a binary 1 digit. Conversely, a binary 0 digit is represented by a relatively low or 0 level signal A and a relatively high or 1 level signal $\bar{A}$. In a similar manner each binary digit produced by input means B and X of the figure are similarly represented by signals B, $\bar{B}$; and X, $\bar{X}$; respectively.

The signals produced by input means A, B, and X are combined in two gating means 10F(1,3) and 10F(2,3) wherein signals $F^{1,3}$ and $F^{2,3}$, and $\bar{F}^{2,3}$ are produced indicating respectively: that 1 or 3 of the input digits produced by means A, B, and X are binary 1; and that 2 or 3 of the input digits produced by means A, B, and X are binary 1.

The signals $F^{1,3}$ produced by gating means 10F(1,3) are applied directly to a direct-current trigger circuit F(1,3) which produces corresponding complementary signals $F_j^{1,3}$, $\bar{F}_j^{1,3}$, the signals being produced without any delay. The signals $F^{2,3}$ and $\bar{F}^{2,3}$ produced by gating means 10F(2,3) are applied to a flip-flop circuit F(2,3) producing corresponding complementary signals $F_{j-1}^{2,3}$ and $\bar{F}_{j-1}^{2,3}$ corresponding to the input signals delayed by 1-binary digit time interval; $j$ representing the binary digit position with respect to input signals A, B, and X.

In addition to the above described gating circuits, the embodiment of Fig. 1 further includes a plurality of gating circuits 10C1, 10C2, and **10*Sb*, respectively controlling a plurality of flip-flops C1, C2**, and $Sb$ producing signals corresponding to the true binary carry-over-one series $C_{j-1}^1$, the true binary carry-over-two series $C_{j-2}^2$, and the true binary carry sum series $Sb$; the subscript $j$ again indicating the digit position with respect to the input signals.

Since, as has been previously mentioned, the value of each binary digit in a 1, 2, 4, 8 binary-coded decimal system has a weight double that of the binary digit in the immediately preceding lesser significant binary place, a carry digit resulting from the addition to two binary 1 digits has a weight double that of each of the binary digits from which it is formed. More specifically, if a carry is derived from the addition of two binary digits each having a weight of one, the carry represents a weight of two. Therefore, if two binary-coded decimal numbers are serially added in the order of least significant corresponding binary digits first and most significant corresponding binary digits last, a single carry signal is sufficient. For example, if two binary 1 digits, each having a weight of two, are added together the total weight of the sum will be four as represented by a binary 0 sum digit and a binary 1 carry digit. The binary 1 carry digit is then added to the binary digits in the next succeeding higher order binary digit place of the two numbers being added; the binary digits of the next succeeding higher order having weights of four. However, where more than two binary-coded numbers are summed simultaneously, a single carry signal is not sufficient. Before any carry has been developed, the sum of the least significant binary digits of the three numbers may have a maximum weight of three providing a sum binary 1 digit and a single carry binary 1 digit. On the next succeeding addition period, however, four binary digits must be simultaneously added, i.e., the three binary digits representing the three input numbers and the carry digit. This means that two classes of carry signals must be developed for a 3-input adder, a first carry having a weight equal to double the weight of each binary digit added and a second carry having a weight double that of the first carry or four times that of each binary digit added. The first carry is conventionally referred to as the carry-over-one, and the second carry as the carry-over-two; the above terminology being utilized herein.

The 3-input binary-coded decimal adder of Fig. 1 also includes a gating circuit 10$Cd^m$ for producing decimal carry signals controlling a flip-flop $Cd^m$, a binary-coded decimal correction circuit (not specifically indicated as such in the figure) comprising a pair of flip-flops F1 and F2 controlled by gating circuits 10F1 and 10F2, respectively, for producing correction signals on the output leads of flip-flops F1 and F2, and an output gating circuit 10S*d* for producing output signals S*d* corresponding to the binary digits of the decimal sum in binary-coded decimal form.

The output signals developed by gating circuits 10S*b*, 10$Cd^m$, and 10F1 are each applied to the input circuit of the corresponding flip-flops S*b*, $Cd^m$, and F1 through a separate complementer circuit C*o*. Each of the complementer circuits C*o* is identical and is responsive to binary input signals impressed on a first input lead and responsive to clock or trigger pulses C*p* impressed on a second input lead for producing a first and a second series of output pulses. The first series of output pulses are produced by gating the input clock pulses C*p* to a first output lead whenever the binary input signals on the first input are 1 level signals. The second series of output pulses are produced by gating the input pulses C*p* to a second output lead whenever the input signals on the first input lead are 0 level signals.

The clock or trigger pulses C*p* are orderly, equally spaced pulses which are externally generated and applied to the 3-input adder circuit of Fig. 1 for synchronizing or timing the operation of the flip-flop circuits. More specifically, the pulses C*p* are impressed on a clock bus of the circuit of Fig. 1, indicated in the figure as a horizontal line with the identifying letters C*p* at the extreme left hand end of the bus. Although each flip-flop is regulated or controlled by signals generated by a corresponding gate circuit, as above indicated, this is actually accomplished by selectively gating clock pulses C*p* to the flip-flop by the corresponding gating circuits, the clock pulses C*p* actually triggering the flip-flop. This will be more fully explained later on.

Direct-current trigger F(1,3) may be any of the well-known types of trigger circuits presently utilized in the electronic art for receiving binary or two-level voltage signals in a single input circuit, reproducing the signals on a first output circuit, and producing an inverted or complemented version of the input signals on a second output circuit, thus developing the original input signal and its complement on the first and second output circuits, respectively. Such circuits are utilized for two purposes: (1) to "boost" or raise the power in the input signals for purposes of driving succeeding circuitry, and (2) to provide the complement of the input signals.

Each of the flip-flops F(2,3), C1, C2, S*b*, $Cd^m$, F2, and F1 is a conventional flip-flop having a 1 and a 0 input circuit such that signals applied separately to the 1 and 0 input circuits sets the flip-flop to stable states representing binary 1 and 0, respectively, and the simultaneous application of signals to both input circuits triggers the flip-flop or causes it to change stable states.

Before considering in more detail the operation of the 3-input adder of Fig. 1, and the detailed structure of the gating circuits 10F(1,3), 10F(2,3), 10C1, 10C2, 10S*b*, 10$Cd^m$, 10F2, 10F1, and 10S*d*, it is considered advantageous at this time to consider in more detail the structure and operation of the direct-current trigger circuit F(1,3), the flip-flops C1, C2, S*b*, $Cd^m$, F2, and F1, and the complementer circuits C*o*.

Figure 2:
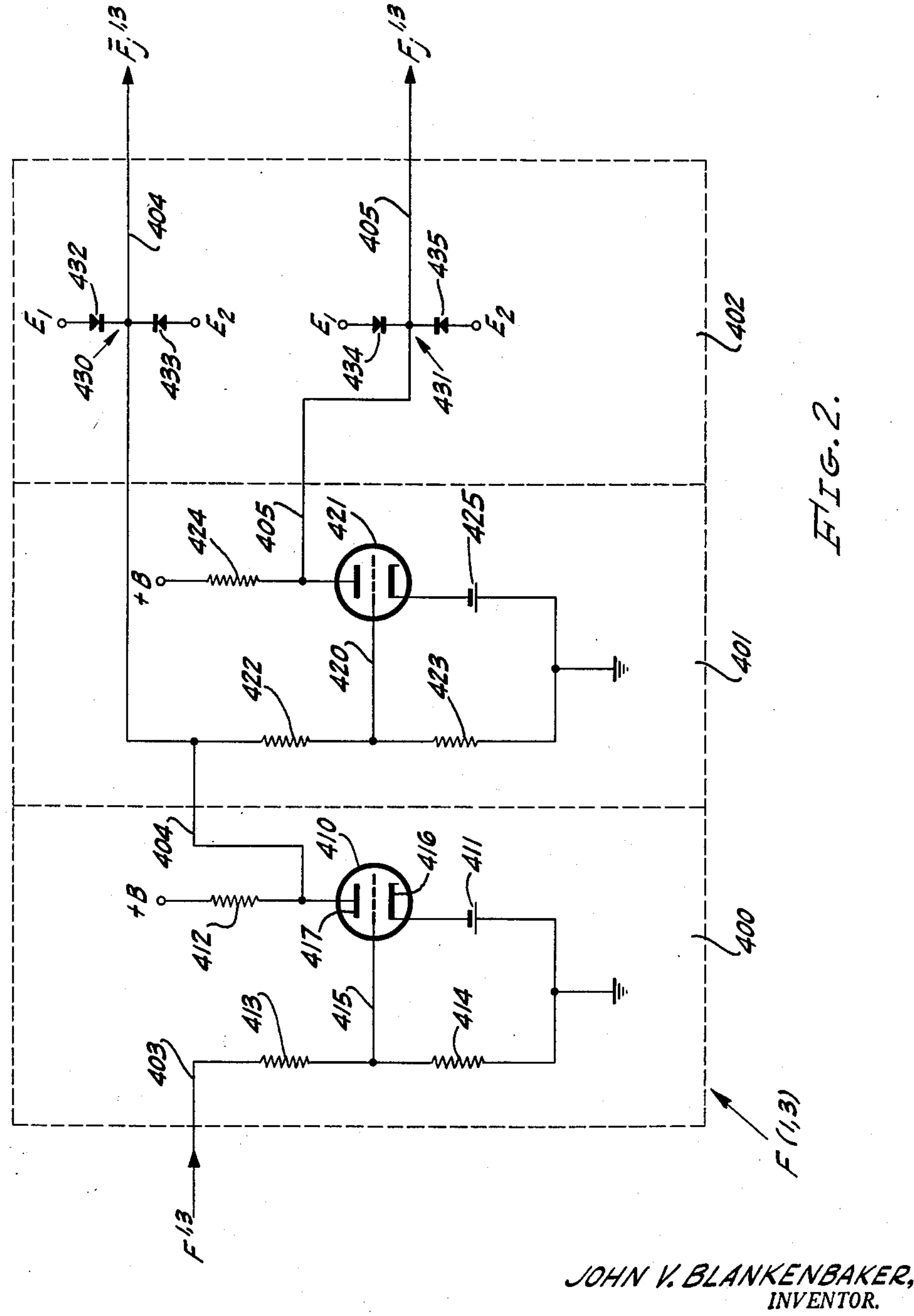
Fig. 2 is a schematic circuit diagram of the direct-current trigger circuit F(1,3), of Fig. 1.

Referring to Fig. 2, there is presented a schematic circuit diagram F(1,3) indicated by broken lines of a preferred embodiment of the direct-current trigger F(1,3) of Fig. 1, for receiving input signals $F^{1,3}$ on an input lead 403 and for producing complementary output signals $\bar{F}_j^{1,3}$ and $F_j^{1,3}$ on output leads 404 and 405, respectively. The direct current trigger F(1,3) includes a first direct current (D.C.) amplifier 400, a second direct current (D.C.) amplifier 401, and a clamping circuit 402, each indicated by broken lines. The first D.C. amplifier 400 is responsive to input signals $F^{1,3}$ on lead 403 for producing output signals $\bar{F}_j^{1,3}$ on lead 404, signals $\bar{F}_j^{1,3}$ being the complement of input signals $F_j^{1,3}$. The second D.C. amplifier 401 is coupled to the first D.C. amplifier 400 and responsive to signals $\bar{F}_j^{1,3}$ produced by D.C. amplifier 400 for developing signals $F_j^{1,3}$ on output lead 405. The signals $F_j^{1,3}$ are signals having the same phase and voltage amplitude as the input signals $F^{1,3}$ but have a greater power capacity than input signals $F^{1,3}$, i.e., are developed from a lower impedance source. Therefore, from a voltage standpoint, output signals $F_j^{1,3}$ are a reproduction of input signals $F^{1,3}$, and output signals $\bar{F}_j^{1,3}$ are complementary signals of input signals $F^{1,3}$.

The clamping circuit 402 is coupled to the first D.C. amplifier 400 and the second D.C. amplifier 401 for receiving complementary output signals $F_j^{1,3}$ and $\bar{F}_j^{1,3}$ on leads 405 and 404, respectively, and clamping the voltage level swings of signals $F_j^{1,3}$ and $\bar{F}_j^{1,3}$ within the same limits as the voltage level swings of input signals $F^{1,3}$.

D.C. amplifier 400 is a conventional direct current amplifier circuit and includes a triode 410, a plate load resistor 412, a biasing battery 411, and an input voltage divider circuit comprised of resistors 413 and 414 in series. The input signals $F^{1,3}$ appearing on lead 403 are applied to the upper extremity of the voltage divider circuit, the lower extremity of which is connected to ground. The common junction point of resistors 413 and 414 is connected to the control grid 415 of triode 410, thus by the proper choice of resistance values for resistors 413 and 414, the input signals $F^{1,3}$ on lead 403 may be reduced to convenient voltage level swings for application to control grid 415. The cathode 416 of tube 410 is returned to ground through the biasing battery 411 thus supplying a convenient grid-cathode bias on tube 410. The anode 417 of tube 410 is coupled to a B+ supply through the load resistance 412. The output lead 404 is directly coupled to the anode 417 of tube 410, thus the output signals $\bar{F}_j^{1,3}$ on lead 404 are developed as the output signals of the D.C. amplifier 400 developed by the load resistor 412.

D.C. amplifier 401 is substantially identical to D.C. amplifier 400 above described in that signals $\bar{F}_j^{1,3}$ developed by amplifier 400 on lead 404 are applied to a control grid 420 of a triode tube 421 through an input voltage divider circuit comprised of resistors 422 and 423 connected in series between the input lead 404 and ground. The cathode of tube 421 is maintained at a potential positive in relation to the control grid 420 by a bias battery 425. The anode of tube 421 is supplied with a B+ supply through a load resistor 424. The output lead 405 is connected directly to the anode of tube 421 and thus signals $F_j^{1,3}$ appearing on lead 405 are developed as the output signals of D.C. amplifier 401.

Direct current amplifiers of the above described class are fully described in "Electronics Experimental Techniques" by William C. Elmore and Mathew Sands, published by McGraw-Hill Book Company, Inc., 1949, pages 180 to 183.

The clamping circuit 402 includes a first diode clamp 430 and a second diode clamp 431. Diode clamp 430 is coupled to output lead 404 for clamping output signals $\bar{F}_j^{1,3}$ within the limits between two direct-current voltage values $E_1$ and $E_2$ impressed on clamp 430, and diode clamp 431 is coupled to lead 405 for maintaining signals $F_j^{1,3}$ appearing on lead 405 within the same limits in response to the voltages $E_1$ and $E_2$ impressed thereon. Diode clamp 430 includes a first diode 432 having its anode connected to the voltage $E_1$, and diode 433 having its cathode connected to voltage $E_2$, the cathode of diode 432 and the anode of diode 433 being connected commonly to the output lead 404. Thus diode clamp 430 operates as a clamping circuit for clamping the signals appearing on lead 404 below the amplitude of voltage $E_1$ and above the amplitude of voltage $E_2$. Diodes 434 and 435 of the diode clamp 431 are similarly connected to the voltages $E_1$ and $E_2$ and the output lead 405 and similarly clamp signals $F_f^{1,3}$ appearing on lead 405 below voltage $E_1$ and above voltage $E_2$. Voltages $E_1$ and $E_2$ are chosen to correspond to the upper and lower limits, respectively, of the binary or two-level voltage input signals $F^{1,3}$ appearing on lead 403. Clamping circuits of this class are fully discussed in "Electronics Experimental Techniques" by William C. Elmore and Mathew Sands, published by McGraw-Hill Book Company, Inc., 1949, pages 114 to 117.

Each of the flip-flops F(2,3), C1, C2, *Sb*, $Cd^m$, F2 and F1 is symbolically represented in Fig. 1 as a square box having 1 and 0 inputs and a corresponding letter therein. In order to illustrate the equivalence between the above described symbol for a flip-flop and an actual circuit, a typical, well-known flip-flop circuit is illustrated in Fig. 3.

Referring to Fig. 3, there is shown a typical flip-flop circuit 900 indicated by broken lines suitable for operation in the multiple input binary-coded decimal adders and subtracters of the present invention. As indicated in the figure, the flip-flop circuit 900 includes a 1 and 0 input circuit identified by leads 901 and 902, respectively, and complementary output leads 903 and 904. The flip-flop circuit of Fig. 3 is described in detail in U.S. Patent 2,644,887, entitled "Synchronizing Generator" by A. E. Wolfe, Jr., issued July 7, 1953. Therefore, further explanation of the detailed construction and operation of the flip-flop 900 is deemed unnecessary here. Fig. 3*a* illustrates the characteristic symbolism used throughout this description for the flip-flop 500 of Fig. 3. It should be noted that there is a direct correspondence between the input and output terminals 901, 902, and 903, 904, respectively, of Fig. 3 and the horizontal lines associated with the symbolic boxes of Fig. 3*a*.

Reference is now made to Fig. 4 wherein there is presented a typical complementer or complementary signal generating network circuit 610 adapted for operation as any one of the complementer circuits *Co* of Fig. 1, the remainder of the complement circuits *Co* of Fig. 1 being a duplicate thereof. The complementary signal generator network 610 is responsive to binary or two-level voltage control signals applied at a first input terminal 612 for selectively gating or passing an electrical pulse or clock signal applied at a second input terminal 614 to produce two complementary electrical pulse output signals at a first output terminal 616 and a second output terminal 618, respectively.

Complementary signal generating network 610 includes first and second electronic gating circuits 620 and 622, respectively, responsive to different predetermined voltage levels of the applied control signal for selectively presenting the applied electrical pulse signal at output terminals 616 and 618, respectively. First gating circuit 620 includes a pair of unidirectional current devices, such as crystal diodes 624 and 626, the cathode of diode 624 being connected to input terminal 614 and the cathode of diode 626 being connected to control terminal 612. Diodes 624 and 626 have their anodes connected together at a common junction 628 which is connected to output terminal 616. Common junction 628 is also coupled to one terminal B+ of a source of biasing potential, not shown, by a biasing resistor 630, the other terminal of the source being grounded.

Second gating circuit 622 also includes a pair of serially connected unidirectional current devices, such as crystal diodes 632 and 634, interconnecting common junction 628 with output terminal 618, the cathode of diode 632 being connected to common junction 628 and the anode of diode 634 being connected to output terminal 618. The common junction 636 of diodes 632 and 634 is in turn coupled to input terminal 614 by a capacitor 638 and to one terminal B+ of the source of biasing potential, not shown, by a biasing resistor 640. In a similar manner, diode 634 has its anode coupled to one terminal $E_2$ of a source of biasing potential, not shown, by a biasing resistor 642. The other terminal of each of the sources is connected to ground. The function of the biasing potentials at terminals B+ and $E_2$ and typical values thereof will be described in detail below. For reasons which will become more clearly understood later, however, it should be stated that the potential appearing at terminal $E_2$ is lower than the potential at terminal B+.

In operation, input terminal 614 is connected to a source 644 of negative electrical clock pulses *Cp* to be selectively passed, and control terminal 612 is connected to a variable potential control or binary signal source, such as a squarewave signal source 646 which controls the selectivity of gating circuits 620 and 622. Source 646 may be any suitable source of a signal having alternate relatively high and relatively low voltage levels, such as a conventional voltage state gating matrix.

Referring now to Fig. 4*a*, there is shown a composite diagram of the waveforms appearing at various points in the complementary signal generating network of Fig. 4. The control signal, generally designated 647, which is applied to control terminal 612 from source 646, includes alternate relatively low and high voltage levels $E_2$ and $E_1$, respectively, the voltage level $E_2$ corresponding substantially to the biasing potential at terminal $E_2$. The negative electrical pulse or clock signal *Cp*, generally designated 645, which is applied to input terminal 614 from source 644, has a steady state voltage level which is preferably substantially equal to potential $E_1$, the periodically recurring negative pulse excursions of signal 645 lowering the potential of the signal accordingly.

Assume now that signal 647 is initially at its low potential value of $E_2$, as shown at time $t_0$ in Fig. 4*a*. Under these conditions the signal, generally designated 629, appearing at common junction 628 will be at a voltage level substantially equal to level $E_2$ due to the clamping action of diode 626. In a similar manner, the signal, generally designated as 637 appearing at common junction 636, will have a potential value substantially equal to $E_2$ due to the clamping action of diode 632. Consequently, the potential difference across diode 634 in second gating circuit 622 is substantially zero volts, whereas diode 624 in first gating circuit 620 is back-biased by substantially the voltage differential between the voltage levels $E_1$ and $E_2$.

Consider now the behavior of complementary signal generating network 610 when signal 645 includes a first negative pulse 645*a*, the pulse amplitude being equal to or less than the voltage differential between voltage levels $E_1$ and $E_2$. Since the amplitude of pulse 645*a* is insufficient to drive the cathode of diode 624 below voltage level $E_2$, it is apparent that diode 624 will remain back-biased. Accordingly, diode 624 will not pass the negative pulse to common junction 628 and hence to output terminal 616.

When negative pulse 645*a* is applied to input terminal 614, the potential of common junction 636, heretofore clamped substantially at level $E_2$ by diode 632, will be lowered accordingly, due to the coupling action of capacitor 638. It is clear, of course, that diode 632 will be immediately back-biased for the duration of pulse 645*a*, since its cathode is held substantially at level $E_2$ due to the clamping action of diode 626, whereas its anode will fall below potential $E_2$ by approximately the amplitude of pulse 645*a*. It follows then, that pulse 645*a* is inhibited from appearing at output terminal 616 by back-biased diodes 624 and 632.

It is clear, however, that diode 634 is now front-biased by the application of pulse **645*a* since the potential of common junction 636 and hence the cathode of diode 634 is driven below the voltage level $E_2$ by the magnitude of the applied pulse. Accordingly, negative pulse 645*a* will be passed by diode 634 and will result in a corresponding negative pulse 619*a* in the signal, generally designated 619, which appears at output terminal 618**.

Assume now that signal 647 swings to its relatively high level potential value $E_1$, and that signal 645 is at its steady state level $E_1$. Under these conditions, the potentials at common junctions 628 and 636 also swing to voltage level $E_1$ due to the clamping action of diodes 626 and 632, respectively. Consequently, the potential difference across diode 624 in first gating circuit 620 is substantially zero, whereas diode 634 in second gating circuit 622 is back-biased by substantially the voltage differential between the voltage levels $E_1$ and $E_2$.

Let us now assume that signal 645 includes a negative pulse **645*b*, the amplitude of which is equal to or less than the voltage differential between voltage levels $E_1$ and $E_2$. It is immediately clear that diode 624 will be front-biased and will, therefore, pass pulse 645*b* and produce a corresponding output pulse 629*b* in signal 629 appearing at output terminal 616**.

Although pulse **645*b* is also applied to common junction 636 by coupling capacitor 638, it will be noted that the pulse 637*b* appearing in signal 637 does not lower the potential of common junction 636 below potential level $E_2$. Accordingly, diode 634 will remain back-biased and thereby inhibit the applied negative electrical pulse from appearing at output terminal 618**.

If signal 647 applied to control terminal 612 of complementary signal generating network 610 again swings to its low potential value of $E_2$ as illustrated in Fig. 4*a*, a negative pulse **645*c* applied to input terminal 614 will again produce a corresponding negative pulse 619*c* at output terminal 618 and will be inhibited from appearing in signal 629 at output terminal 616. It is clear, therefore, that complementary signal generating network 610 is responsive to the relatively high and relatively low potential levels of control signal 647 for selectively passing negative electrical pulses applied at input terminal 612 to produce two complementary output signals at output terminals 616 and 618, respectively. In other words, an applied electrical pulse signal will be presented at either output terminal 616 or at output terminal 618 depending upon whether control signal 647** is at its relatively high potential value or its relatively low potential value, respectively.

As set forth above, diode 626 and resistor 630 are utilized for clamping common junction 628 at substantially the instantaneous voltage of control signal 647. However, diode 626 also performs the additional function of inhibiting electrical pulses appearing at junction 628, such as pulse **629*b* in signal 629, from being applied back into squarewave signal source 646. For example, when electrical pulse 645*b* is applied at input terminal 614, the potential of common junction 628 drops below its clamped potential level $E_1$ by the voltage amplitude of pulse 629*b*. Since the potential $E_1$ is being applied to the cathode of diode 626 at this time, diode 626 is back-biased for the duration of pulse 629*b*, thereby effectively isolating source 646 from clock pulse source 644. The combination of diode 626 and resistor 630** may, therefore, be termed an isolating network.

It will be recognized by those skilled in the computer art that if squarewave signal source 646 comprises a voltage state gating matrix having a conventional diode "and" gate output circuit, the isolating network including diode 626 and resistor 630 may be eliminated from complementary signal generating network 610. In other words, if squarewave signal source 646 includes an "and" gate output circuit, the function of diode 626 and resistor 630 may be performed by the output circuit of the source, and the isolating network may be excluded from complementary signal generating network 610.

The above described complementer or complementary signal generator is fully described and claimed in copending U.S. patent application, Serial No. 308,045, for "Complementary Signal Generating Network," by Daniel L. Curtis, filed September 5, 1952, now Patent No. 2,812,451.

The structure of the gating circuits providing the input signals for trigger circuit F(1,3) and the various flip-flops which are included in the embodiments of Fig. 1 are defined according to certain Boolean algebraic equations which specify the sequences of stable states of the corresponding flip-flop or trigger circuit. Before considering the specific mechanization of the gating circuits illustrated in Fig. 1, therefore, it is essential, for a complete understanding of the invention, to consider the basic algebraic equations which define the gating circuits. It will be noted that the variables used in the following equations correspond to the electrical signals indicated in Fig. 1, so that each equation defines an electrical function of the embodiment shown.

Logical Boolean algebraic equations will be frequently employed in this discussion for explaining the mechanization of circuits employing "and" and "or" circuits or gates which correspond directly to the logical equations. Such circuits are well known in the art, typical circuits being described in detail in U.S. Patent No. 2,644,887, filed December 18, 1950, entitled "Synchronizing Generator" by A. E. Wolfe, Jr. Regardless of structural variations, the functional characteristics of these logical circuits remain substantially constant in the art, i.e., a logical "and" circuit produces an output signal only when signals are simultaneously applied to all the inputs, and a logical "or" circuit produces an output signal when a signal is applied to at least one of its inputs.

With 3-input variables $A_j$, $B_j$, and $X_j$, we may define functions $F_j^{1,3}$ and $F_j^{2,3}$ indicating when 1 or 3 of the variables $A_j$, $B_j$, and $X_j$ are 1, and when 2 or 3 of the variables are 1 according to the following Boolean algebraic expressions:

$$F_j^{1,3}=A_j.\bar{B}_j.\bar{X}_j+\bar{A}_j.B_j.\bar{X}_j+\bar{A}_j.\bar{B}_j.X_j+A_j.B_j.X_j$$

$$F_j^{2,3}=A_j.B_j+A_j.X_j+B_j.X_j$$

In these equations the dot (.) indicates the logical "and" and the plus (+), the logical non-exclusive "or"; so that the function $A_j.B_j$ indicates that if both $A_j$ "and" $B_j$ are 1, $A_j.B_j$ is 1, and 2 or 3 of the input digits $A_j$, $B_j$, and $X_j$ must be 1. Similarly, $A_j.X_j$ and $B_j.X_j$ indicate the other situations where 2 or 3 input signals are 1. The complete function for flip-flop F(2,3), then, is the "or" function of the 3 conditions $A_j.B_j$, $A_j.X_j$, and $B_j.X_j$ so that the function is 1 if any one "or" more of these conditions is satisfied. In a similar manner the function for flip-flop F(1,3) is 1 if any of the conditions: $A_j\bar{B}_j.\bar{X}_j$; $\bar{A}_j.B_j.\bar{X}_j$; $\bar{A}_j.\bar{B}_j.X_j$; or $A_j.B_j.X_j$ is 1, indicating that 1 or 3 of the input signals $A_j$, $B_j$, and $X_j$ are 1.

With the variables $F^{1,3}$ and $F^{2,3}$ we may define any of the possible input situations, namely: all input signals being 0; 1 input signal being 1; 2 input signals being 1; and 3 input signals being 1. The situations are represented as (0), (1), (2), and (3), respectively, and the defining equations appear as follows:

$$(0)=\bar{F}^{2,3}.\bar{F}^{1,3}$$

$$(1)=\bar{F}^{2,3}.F^{1,3}$$

$$(2)=F^{2,3}.\bar{F}^{1,3}$$

$$(3)=F^{2,3}.F^{1,3}$$

It will be noted that the situations (0), (1), (2), and (3) are defined directly as their binary equivalents in terms of the variables $F^{2,3}$ and $F^{1,3}$. That is, the conditions 00, 01, 10, and 11 for $F^{2,3}$ and $F^{1,3}$ directly correspond to the binary numbers. While this separation of input variables provides a convenient means for simplifying the analysis which follows, it should be understood that other functions may be utilized which do not have a direct correspondence to binary numbers. For example, the functions $F^{2,3}$ and $F^{0,2}$ may be utilized to define the input situations as follows:

$$(0)=\bar{F}^{2,3}.F^{0,2}$$
$$(1)=\bar{F}^{2,3}.\bar{F}^{0,2}$$
$$(2)=F^{2,3}.F^{0,2}$$
$$(3)=F^{2,3}.\bar{F}^{0,2}$$

where $F_j^{0,2}$ is represented by the expression:

$$F_j^{0,2}=\bar{A}_j.\bar{B}_j.\bar{X}_j+\bar{A}_j.B_j.X_j+A_j.\bar{B}_j.X_j+A_j.B_j.\bar{X}_j$$

Since each of the input numbers are received by the 3-input adder of Fig. 1 in the 1, 2, 4, 8 binary-coded decimal form in the order of least significant binary digit first and most significant binary digit last, a binary digit in the $j^{th}$ place will have a weight twice that of a binary digit in the $j-1$ place, where $j$ indicates the digit place with respect to the input signals. Further, since a carry-over-one signal $C_j^1$ will have a weight double that of each of the input signals $A_j$, $B_j$, or $X_j$ of the same binary place, and a carry-over-two signal $C_j^2$ will have a weight four times that of each of the signals $A_j$, $B_j$, and $X_j$, the weights of the carry-over-one and carry-over-two may be equalized by delays of one and two binary places, respectively. Thus, the true binary sum $Sb_j$, the carry-over-one of the previous binary place $C_{j-1}^1$, and the carry-over-two of two binary places previous $C_{j-2}^2$, all have equal weights.

Keeping the above relationships in mind, a truth table may be derived, Table I below, expressing values for the variables $Sb_j$, $C_j^1$, and $C_j^2$ in terms of the variables $F_j^{2,3}$, $F_j^{1,3}$, $C_{j-1}^1$, and $C_{j-2}^2$, wherein the variables $F_j^{1,3}$, $C_{j-1}^1$, and $C_{j-2}^2$ all have equal weights and $F_j^{2,3}$ has a weight double that of each of the variables $F_j^{1,3}$, $C_{j-1}^1$, and $C_{j-2}^2$. In Table I, a variable represented by a 1 level signal is indicated by the digit 1 and a variable represented by a 0 level signal by the digit 0. It should be noted that a 0 in the table, in addition to indicating a 0 level signal, also indicates that the complement of the signal is a 1 level signal. Thus if the value of variable $F_j^{2,3}$ is indicated by a 0 in the table, this indicates that signal $F_j^{2,3}$ is a 0 level signal and that signal $\bar{F}_j^{2,3}$ is a 1 level signal.

and fourth columns, respectively, of section (*a*) of the table and are generally designated as "independent variables." The variables $C_j^2$, $C_j^1$, and $Sb_j$ appear at the top of the first, second, and third columns, respectively, of section (*b*) of the table and are generally designated as "dependent variables." On the left hand edge of the table is an additional column designated as "total weights." In this column, total relative weight of the binary 1's of each row of section (*a*) of the table are indicated in terms of the weight "X" of an input binary signal in the $j^{th}$ binary digit position. As the total weight of the binary 1's of each row of section (*b*) of the table is equal to the total weight of the binary 1's on the same row in section (*a*), the "total weights" column of the table also indicates the total relative weights of each row in section (*b*).

Each variable of Table I is identified at the top of a column by the binary signal representing the variable, and the relative weight of each variable, in terms of X, is indicated just below the signal designation of the colum. Each row of the table is identified by a rule number in the extreme right hand column of the table.

Section (*c*) of the table includes two columns designated 1C1 and 0C1, respectively, generally designated as "flip-flop" C1 input requirements" and includes designations of the input requirements to the 1 and 0 input circuits, respectively, of flip-flop C1.

Table I is derived as follows. All possible combinations of the independent variables $F_j^{2,3}$, $F_j^{1,3}$, $C_{j-1}^1$, and $C_{j-2}^2$ of section (*a*) are first indicated in an orderly fashion. This is accomplished by assuming the values of all 0's for rule 1. The next rule or row of section (*a*) is then obtained by adding 1 in a binary fashion to signal $C_{j-2}^2$. This is repeated for each row or rule until section (*a*) of the table is completed, utilizing the assumption, for this purpose only, that signal $C_{j-2}^2$ is the least significant signal, and that the signals to the left became progressively more significant until signal $F_j^{2,3}$ is treated as the most significant signal.

Continuing with an explanation of the derivation of the Table I, the manner of deriving the dependent variables of sections (*b*) will now be explained. Remembering that for any given binary digit place $j$, the value or weight of the variables represented by signals $F_j^{2,3}$ will be double that of the weight of each of the variables represented by signals $F_j^{1,3}$, $C_{j-1}^1$, and $C_{j-2}^2$, the total

*Table I*

| | Section (*a*) Independent Variables | | | | Section (*b*) Dependent Variables | | | Section (*c*) Flip-Flop C1 Input Requirements | | Rules |
|---|---|---|---|---|---|---|---|---|---|---|
| Signals | $F_j^{2,3}$ | $F_j^{1,3}$ | $C_{j-1}^1$ | $C_{j-2}^2$ | $C_j^2$ | $C_j^1$ | $Sb_j$ | 1C1 | 0C1 | |
| Relative Weights | 2X | 1X | 1X | 1X | 4X | 2X | 1X | | | |
| Total weights: | | | | | | | | | | |
| 0 | 0 | 0 | 0 | 0 | 0 | 0 | 0 | 0 | ------- | 1 |
| 1X | 0 | 0 | 0 | 1 | 0 | 0 | 1 | 0 | ------- | 2 |
| 1X | 0 | 0 | 1 | 0 | 0 | 0 | 1 | ------- | 1 | 3 |
| 2X | 0 | 0 | 1 | 1 | 0 | 1 | 0 | ------- | 0 | 4 |
| 1X | 0 | 1 | 0 | 0 | 0 | 0 | 1 | 0 | ------- | 5 |
| 2X | 0 | 1 | 0 | 1 | 0 | 1 | 0 | 1 | ------- | 6 |
| 2X | 0 | 1 | 1 | 0 | 0 | 1 | 0 | ------- | 0 | 7 |
| 3X | 0 | 1 | 1 | 1 | 0 | 1 | 1 | ------- | 0 | 8 |
| 2X | 1 | 0 | 0 | 0 | 0 | 1 | 0 | 1 | ------- | 9 |
| 3X | 1 | 0 | 0 | 1 | 0 | 1 | 1 | 1 | ------- | 10 |
| 3X | 1 | 0 | 1 | 0 | 0 | 1 | 1 | ------- | 0 | 11 |
| 4X | 1 | 0 | 1 | 1 | 1 | 0 | 0 | ------- | 1 | 12 |
| 3X | 1 | 1 | 0 | 0 | 0 | 1 | 1 | 1 | ------- | 13 |
| 4X | 1 | 1 | 0 | 1 | 1 | 0 | 0 | 0 | ------- | 14 |
| 4X | 1 | 1 | 1 | 0 | 1 | 0 | 0 | ------- | 1 | 15 |
| 5X | 1 | 1 | 1 | 1 | 1 | 0 | 1 | ------- | 1 | 16 |

where X equals the weight of a binary 1 digit in binary digit place $j$ of each of the input numbers.

Table I is divided into three major sections, indicated as sections (*a*), (*b*), and (*c*), respectively. Reading from left to right, the variables $F_j^{2,3}$, $F_j^{1,3}$, $C_{j-1}^1$, and $C_{j-2}^2$ are indicated at the top of the first, second, third, relative weights of the independent variables for each row or rule of section (*a*) may be readily obtained. The total relative weights so derived are entered in the total weights column.

The value of the sum signal $Sb_j$ and the carry signals $C_j^1$ and $C_j^2$ for each rule are then entered in section (*b*)

of the table in accordance with the total weight of the independent variables on the corresponding row. For example, when all the independent variable signals of section (*a*) are zeros, as in rule 1 of the table, all the dependent variables of section (*b*) must also be zeros. With reference to rule 2, the total relative weight of the independent variables of section (*a*) is 1X which is satisfied by making $Sb_j$ equal to 1 and $C_j^1$ and $C_j^2$ each equal to 0. In a similar manner, the values of the independent variables of section (*b*) of Table I are derived for the remainder of the rules of the table. Thus, for example, noting rule 13, the total relative weight of the variables of section (*a*) is 3X, which can only be obtained in section (*b*) of the table by making both $Sb_j$ and $C_j^1$ equal to 1 and $C_j^2$ equal to 0.

As will be more fully explained later on, the symbols 1C1 and 0C1 appearing at the top of the columns of section (*c*) of the table identify the input requirements of the flip-flop C1. Briefly stated at present, 1C1 and 0C1 indicate the input requirements of the 1 and 0 input circuits, respectively, of flip-flop C1, a 1 in a column indicating that a triggering or clock pulse must be applied to the corresponding input and a 0 in the column indicating that a triggering pulse must not be applied to the input. A blank (neither a 1 nor a 0) indicates that a triggering pulse is not necessary, but is permissible at the corresponding input.

By a comparison of the previous state of the flip-flop C1, as indicated by the value of signal $C_{j-1}^1$, with the desired present state of the flip-flop, indicated by signal $C_j$, the values for 1C1 and 0C1 may be readily ascertained. Thus, when signal $C_{j-1}^1$ is 0 and signal $C_j$ is 1 for a selected row or rule, a triggering pulse must be applied to the 1 input 1C1 of the flip-flop. When signal $C_{j-1}$ is 1 and signal $C_j$ is 0, a pulse must be applied to the 0 input 0C1 of the flip-flop. This is illustrated by insertion of a 1 under column 1C1 and 0C1, respectively, on the correspond.ng rows or rules of the table. If signals $C_{j-1}$ and $C_j$ of a rule of the table are equal, no trigger pulse need be applied to the inputs of the flip-flop, but a 0 is added to the appropriate column of section (*c*) of the table indicating that a triggering pulse affecting a change of state of the flip-flop must be inhibited.

Noting rule 3 of the table by way of example, signal $C_{j-1}^1$ is 1 and $C_j^1$ is 0, thus, a 1 is inserted under the 0C1 column heading indicating that a triggering pulse must be applied to the 0 input of flip-flop C1. As a further example, consider rule 8. Signal $C_{j-1}^1$ is 1 and signal $C_j^1$ is 1, thus, it is not necessary to apply a signal to either the 1 or 0 input of the flip-flop, but no signal is allowed on the 0 input as indicated by a 0 in the 0C1 column. In this manner, the remainder of the values for section (*c*) of the table are inserted.

From Table I above the dependent variables $Sb_j$, $C_j^1$, and $C_j^2$ may be expressed by logical Boolean functions in terms of the independent variables of section (*c*) of the table. Considering first the derivation of an expression for $Sb_j$, it is noted that signal $Sb_j$ is a 1 level signal on rules 2, 3, 5, 8, 10, 11, 13, and 16, and a 0 level signal on all other rules. On those rules when signal $F_j^{1,3}$ is 1, i.e., rules 5, 6, 7, 8, 13, 14, 15, and 16, signal $Sb_j$ is 1 only during the time that signals $C_{j-1}^1$ and $C_{j-2}^2$ are both 1's (rules 8 and 16) or both 0's (rules 5 and 13). Thus, the logical Boolean expression $$Sb_j=F^{1,3}(C_{j-2}^2.C_{j-1}^1+\bar{C}_{j-2}^2.\bar{C}_{j-1}^1)$$

defines signal $Sb_j$ for rules 5, 8, 13, and 16. In the above expression, the dot (.) and parenthesis ( ) indicate the logical Boolean "and," the plus (+) the logical Boolean "or," and the bar (‾) represents the complement of the signal. When signal $F_j^{1,3}$ is 0 in the table, signal $Sb_j$ is 1 only when either signal $C_{j-1}^1$ or $C_{j-2}^2$ is 1 but not both, as indicated by rules 2, 3, 10, and 11. This may be expressed in logical Boolean form as $$Sb_j=\bar{F}_j^{1,3}(C_{j-2}^2.\bar{C}_{j-1}^1+\bar{C}_{j-2}^2.C_{j-1}^1)$$

where the bar (‾) over a signal indicates, as previously, the complement of the signal. By logically adding the above two expressions for $Sb_j$, a combined junction expressing all conditions for $Sb_j$ may be written as:

$$Sb_j=\bar{F}_j^{1,3}.(C_{j-2}^2.\bar{C}_{j-1}^1+\bar{C}_{j-2}^2.C_{j-1}^1)+F_j^{1,3}.(C_{j-2}^2.C_{j-1}^1+\bar{C}_{j-2}^2.\bar{C}_{j-1}^1)$$

The function for *Sb* may also be considered to be a 1 or 3 function of the variables $F^{1,3}$, $C_{j-2}^2$, and $C_{j-1}^1$ which may conveniently be symbolized by the function $G_j^{1,3}(F_j^{1,3}, C_{j-2}^2, C_{j-1}^1)$ where G is introduced to indicate a function of other functions such as $F_j^{1,3}$ or $F_j^{2,3}$. In terms of the input variables $A_j$, $B_j$, $X_j$ and the binary carries $C_{j-2}^2$ and $C_{j-1}^1$ we may also express the sum *Sb* as the function $F_j^{1,3,5}(A_j, B_j, X_j, C_{j-2}^2, C_{j-1}^1)$. It should be apparent, then, that there are a considerable number of choices of functions defining the sum *Sb*.

In a similar manner the binary carry function $C_j^1$ may be determined from Table I to be expressed by the following function:

$$C_j^1=\bar{F}_j^{2,3}.\bar{F}_j^{1,3}.C_{j-2}^2.C_{j-1}^1+\bar{F}_j^{2,3}.F_j^{1,3}.(C_{j-2}^2+C_{j-1}^1)+F_j^{2,3}.\bar{F}_j^{1,3}.(\bar{C}_{j-2}^2+\bar{C}_{j-1}^1)+F_j^{2,3}.F_j^{1,3}.\bar{C}_{j-2}^2.\bar{C}_{j-1}^1$$

In observing Table I it is noted that $C_j^2$ is 1 only when $F_j^{2,3}$ is 1 (since at least two input variables $A_j$, $B_j$, and $X_j$ are required), and that under these conditions it is the complement of the variable $C_j^1$ so that $C_j^2$ may be derived from $C_j^1$ as follows:

$$C_j^2=F_j^{2,3}.\bar{C}_j^1=F_j^{2,3}.[C_{j-2}^2.C_{j-1}^1+F_j^{1,3}.(C_{j-2}^2+C_{j-1}^1)]$$

Before considering the mechanization of gating circuits 10F(1,3), 10F(2,3), 10C1, 10C2, and **10S*b***, it is necessary to understand the general form of equations utilized to define the input signals for direct-current trigger circuits and flip-flops. The discussion here is brief since the general theory of flip-flop control functions is discussed in considerable detail in copending U.S. patent applications: Serial No. 327,567 for "Binary-Coded Flip-Flop Counters," by E. C. Nelson, filed December 20, 1952, issued December 10, 1957, as Patent No. 2,816,223; Serial No. 327,131, for "Binary-Coded Flip-Flop Counters," by R. R. Johnson, filed December 20, 1952, issued September 23, 1958, as Patent No. 2,853,238.

Three general types of flip-flop or trigger circuit input functions may be utilized to control the sequence of stable states of an associated flip-flop or trigger circuit. According to one type of equation, the sequence of stable states of the controlled device are directly defined so that the value of the equation (1 or 0) at a particular time indicates the desired setting. This type of function may be utilized to define a voltage level signal which directly sets the associated trigger circuit, without delay. Where a flip-flop circuit is controlled with this type of function it must be set through a complementer circuit, such as that previously described. In either situation it is convenient to refer to the function defining direct setting as a "setting function." In controlling flip-flops through gating circuits defined by "setting functions" it will be noted that a one digit time delay is introduced; that is, the flip-flop assumes a stable state during the following digit time interval corresponding to the "setting function" of the previous time interval.

According to a second type of defining equation, the conditions for changing the flip-flop stable state, or "triggering" the flip-flop are established. When this type of mechanization is utilized, a conventional flip-flop is employed and the gating circuit signal is applied to both 1 and 0 input circuits of the flip-flop.

In many situations, it is desirable to separate the changing type of equation into two partial-changing functions which separately define the conditions for changing the associated flip-flop stable state from 0 to 1, and from 1 to 0. The partial-changing functions are particularly useful where the equations include the output signals of the flip-flop to be controlled. In this case the partial-changing functions may be simplified to "simplified partial changing functions" according to rules which are briefly considered below and fully described in the above-mentioned copending applications by E. C. Nelson and R. R. Johnson.

An convenient notational system may be employed for designating the "setting," "changing," "partial changing," and "simplified partial changing" functions above defined. For example, in the above-mentioned copending applications by R. R. Johnson and E. C. Nelson, the setting functions are designated by the letter "S" followed by the letter "*a, b, . . .* or *n*" indicating the particular flip-flop which is controlled, and either a 1 or 0 depending upon whether the controlled flip-flop is to be set to the 1 or the 0 state, respectively. The changing functions are represented by the letter "C" followed by the letter "*a, b, . . . n*," and the partial changing functions are represented in the same manner as the changing functions with the addition of a 1 or 0 indicating whether the flip-flop is changed to 1 or changed to 0. The simplified partial changing functions are designated by the number 1 or 0 indicating whether the functions define signals applied to the 1 or 0 input of the flip-flop, followed by the letter "A, B, . . . or N" representing the flip-flop controlled.

This application uses notations similar generally to those previously used in the copending applications by Johnson and Nelson. However, this application uses a different notation for "setting" functions than that used in the copending applications by Johnson and Nelson. As will become apparent subsequently, a "setting" function may be defined as that which triggers a flip-flop to or maintains the flip-flop in a particular state of operation such as the binary "1" state. Only one form of setting function, that for setting a flip-flop to the 1 state, is utilized in this application, the setting function for setting a flip-flop to the 0 state being considered unnecessary. The setting function for setting a flip-flop to the 1 state is represented in this application by the symbol "T*o*" followed by the letter "A, B, . . . or N" indicating the flip-flop controlled.

Thus the setting function for setting a flip-flop $F_j$ to the 1 state is designated by the notation "T*o*$F_j$," the changing function for the flip-flop as "C$f_j$," and the simplified partial changing functions as "1$F_j$" and "0$F_j$" for application to the 1 and 0 input circuits, respectively, of the flip-flop. No notational system is employed for partial changing functions as these functions are not employed in this description. The direct-current trigger circuit function utilized corresponds to the setting function *to*$F_j$.

As is more fully explained in the above-mentioned copending applications to E. C. Nelson and R. R. Johnson, any flip-flop function may be written in the form:

$$toFj=\bar{F}^j.G+F^j.\bar{H}$$

which may be reduced to the simplified partial-changing functions:

$$1Fj=G$$
$$0Fj=H$$

G and H being any functions of variables other than $F^j$ and $\bar{F}^j$, where $F^j$ and $\bar{F}^j$ are the signals produced by flip-flop F*j*. In terms of algebraic variables this relationship may also be expressed as:

$$F'=\bar{F}.G+F.\bar{H}$$

where F′ indicates the new state of flip-flop F as a function of its previous state F and its complement $\bar{F}$.

In analyzing the function for F′ it is noted that if the present flip-flop signal is 0 ($\bar{F}=1$), F′ is equal to the previous function G; and that if the flip-flop signal is 1 the new signal F′ is equal to $\bar{H}$. As is more fully explained in the above-mentioned copending application to J. V. Blankenbaker, this relationship may be utilized to define the 1 and 0 input functions for the flip-flops, since the function 1F is equal to F′ whenever the previous flip-flop signal was 0, and the function 0F is equal to $\bar{F}'$ whenever the previous flip-flop signal was 1.

From these principles it should be apparent that the input function 1C1, defining the 1 input for flip-flop C may be determined by writing down the binary function $C_j^1$ whenever $C_{j-1}^1$ is 0; and that the input function 0C1 may be determined by writing down the binary function $\bar{C}_j^1$ whenever $C_{j-1}^1$ is equal to 1. In this situation, then, $C_j^1$ corresponds to the new flip-flop state F′ and $C_{j-1}^1$ corresponds to its previous state. In the case of all zero input variables, situation (0), it is noted that 1C1 is always 0 since for each $C_{j-1}^1=0$, $C_j^1$ is 0; and that 0C1 assumes the values 1, 1, and 0 opposite to the positions where $C_{j-1}^1$ is equal to 1, since in these positions $C_j^1$ assumes the values 0, 0, 1 and the complementary carry $\bar{C}_j^1$ the values 1, 1, 0.

It is convenient then to reduce Table I into a separate Table II for 1C1 and 0C1 as indicated below. Since section (*c*) of Table I is derived with reference to the corresponding values of the variables $C_{j-1}^1$ and $C_j^1$, these variables need no longer be considered in determining the values for 1C1 and 0C1. Table II, therefore, is derived by expressing the values for 1C1 and 0C1 in terms of the remaining independent variables of section (*a*) of Table I. Thus, the 16 rules of Table I reduce to 8 rules for Table II since there can be but 8 possible permutations for these variables. Considering the columns of Table II from left to right, the first column of the table lists new rule numbers, the second column includes values for the variable $C_{j-2}^2$, the third column includes values for the variable $F_j^{2,3}$, the fourth column the values of variable $F_j^{1,3}$, the fifth and sixth columns list the values for 1C1 and 0C1, respectively, and the seventh and last column on the right identifies the corresponding rule numbers of Table I above. Table II is derived by making a single row or rule for each case in Table I wherein the values for $F_j^{2,3}$, $F_j^{1,3}$, and $C_{j-2}^2$ are the same. For example, rules 1 and 3 of Table I have the same values for all independent variables of section (*a*) except the values for $C_{j-1}^1$ which is eliminated in Table II. Thus, rules 1 and 3 are combined as rule 1 in Table II. The functions 1C1 and 0C1 are then derived from Table II as indicated.

*Table II*

| Rule | $C_{j-2}^2$ | $F_j^{2,3}$ | $F_j^{1,3}$ | 1C1 | 0C1 | Rules of Table I |
|---|---|---|---|---|---|---|
| 1 | 0 | 0 | 0 | 0 | 1 | 1 and 3. |
| 2 | 1 | 0 | 0 | 0 | 0 | 2 and 4. |
| 3 | 0 | 0 | 1 | 0 | 0 | 5 and 7. |
| 4 | 1 | 0 | 1 | 1 | 0 | 6 and 8. |
| 5 | 0 | 1 | 0 | 1 | 0 | 9 and 11. |
| 6 | 1 | 1 | 0 | 1 | 1 | 10 and 12. |
| 7 | 0 | 1 | 1 | 1 | 1 | 13 and 15. |
| 8 | 1 | 1 | 1 | 0 | 1 | 14 and 16. |

$$1C1=F_j^{2,3}.(\bar{C}_{j-2}^2+\bar{F}_j^{1,3})+C_{j-2}^2.\bar{F}_j^{2,3}.F_j^{1,3}$$
$$0C1=\bar{C}_{j-2}^2.\bar{F}_j^{2,3}.\bar{F}_j^{1,3}+F_j^{2,3}.(C_{j-2}^2+F_j^{1,3})$$

A complete set of mechanization functions defining the binary sum producing section of the embodiment of Fig. 1 may now be represented as follows:

$$toF(1,3)=A.\overline{B}.\overline{X}+\overline{A}.B.\overline{X}+\overline{A}.\overline{B}.X+A.B.X$$

$$10F(2,3)\begin{cases}1F(2,3)=F_j^{2,3}.Cp=(A.B+A.X+B.X).Cp\\0F(2,3)=\overline{F}_j^{2,3}.Cp=(\overline{A}.\overline{B}+\overline{A}.\overline{X}+\overline{B}.\overline{X}).Cp\end{cases}$$

$$(10C1)\begin{cases}1C1=[F_j^{2,3}.(\overline{C}_{j-2}^{2}+\overline{F}_j^{1,3})+C_{j-2}^{2}.\overline{F}_j^{2,3}.F_j^{1,3}].Cp\\0C1=[F_j^{2,3}.(C_{j-2}^{2}+F_j^{1,3})+\overline{C}_{j-2}^{2}.\overline{F}_j^{2,3}.\overline{F}_j^{1,3}].Cp\end{cases}$$

$$(10C2)\begin{cases}1C2=F_{j-1}^{2,3}.\overline{C}_{j-1}^{1}.Cp\\0C2=(\overline{F}_{j-1}^{2,3}+C_{j-1}^{1}).Cp\end{cases}$$

(10*Sb*)

$$toSb=[\overline{F}_j^{1,3}.(C_{j-}^{2}.\overline{C}_{j-1}^{1}+\overline{C}_{j-2}^{2}.C_{j-1}^{1})+F_j^{1,3}.(C_{j-2}^{2}.C_{j-1}^{1}+\overline{C}_{j-2}^{2}.\overline{C}_{j-1}^{1})].Cp$$

where signal *Cp* is introduced as a final "and" condition to synchronize the entry of digits into the flip-flops, one pulse *Cp* being applied each binary digit time of operation. No clock pulse is required to control direct-current trigger circuit F(1,3). It will be noted that signal $C_{j-2}^2$ is obtained from signals $F_{j-1}^{2,3}$, $\overline{F}_{j-1}^{2,3}$, $C_{j-1}^1$, and $\overline{C}_{j-1}^1$ after one delay, introducing a total of two binary digit time delays as required.

As has been previously mentioned and, is well known in the art, the signals impressed on the inputs of a flip-flop do not affect the output signals of the flip-flop until one binary bit or digit time later. This is readily apparent from a realization that a flip-flop is triggered by a clock pulse *Cp*. The controlling gating circuit associated with a flip-flop provides two-level voltage gating signals which control the application of clock pulses *Cp* to the inputs of a flip-flop. Thus, since the gating circuit 10C2 of Fig. 1 controls the application of clock pulses *Cp* to the input circuits of flip-flop C2 in response to signals $F_{j-1}^{2,3}$, $\overline{F}_{j-1}^{2,3}$, $C_{j-1}^1$, and $\overline{C}_{j-1}^1$ the output signals of flip-flop C2 representing a function of signals $F_{j-1}^{2,3}$ and $C_{j-1}^1$ and their complements will occur one clock pulse *Cp* later in time or at $j-2$ time. More specifically, the signals $F_{j-1}^{2,3}$ represent the signals $F_j^{2,3}$ one clock pulse later, or expressed in another way, represent the value for the variable $F_j^{2,3}$ in the next lower significant binary digit place. Similarly, signal $C_{j-1}^1$ represents the value of variable $C_j^1$ in the next lower order significant binary digit place, where each signal is referenced in time or digit place to the input signals $F_j^{1,3}$, $F_j^{2,3}$ and their complements. Thus, the output of flip-flop C2, appearing one digit time or clock pulse *Cp* later than the input signals to the flip-flops, rightfully are designated as $C_{j-2}^2$ indicating that the signals produced by flip-flop C2 represent the carry-over-two function $C^2$ delayed two binary digit time intervals or clock pulses *Cp*.

As indicated in Fig. 1, each of the "and" functions in the equations defining gating circuits 10F(1,3), 10F(2,3), 10C1, 10C2, and **10*Sb* (in the corresponding equations shown above) is provided by an "and" circuit, symbolically represented in the figure as a dot (.) enclosed by a semi-circle, which responds to signals applied to separate input terminals and produces a 1-representing output signal only when all input signals are 1-representing signals. Thus, "and" circuits 10C1–1 and 10C1–2 in gating circuit 10C1 respond to signals $F_j^{2,3}$, $(\overline{C}_{j-2}^2+\overline{F}_j^{1,3})$; and signals $C_{j-2}^2$, $\overline{F}_j^{2,3}$, $F_j^{1,3}$; respectively, to produce 1-representing output signals according to the "and" functions: $F_j^{2,3}.(\overline{C}_{j-2}^2+\overline{F}_j^{1,3})$ and $C_{j-2}^2.\overline{F}_j^{2,3}.F_j^{1,3}$. Each of the "or" functions in the above equations is provided with an "or" circuit symbolically represented in the figure with a plus (+) enclosed by a semi-circle. Thus, the "or" function $(\overline{C}_{j-2}^2+\overline{F}_j^{1,3})$ is produced by "or" circuit 10C1–3; and the functions $F_j^{2,3}.(\overline{C}_{j-2}^2+\overline{F}_j^{1,3})$ and $C_{j-2}^2.\overline{F}_j^{2,3}.F_j^{1,3}$ are combined in "or" circuit 10C1–4** to produce the desired input function 1C1. The mechanization of the other functions should be apparent from this example.

In order to illustrate the equivalence between the above described symbols for logical "and" and "or" circuits and actual circuits, a typical logical "and" circuit is shown in Fig. 5 and a typical logical "or" circuit is illustrated in Fig. 6.

Referring to Fig. 5 there is shown a typical logical "and" circuit 910 indicated by broken lines and having two inputs 911 and 912 coupled by diodes 915 and 916, respectively, to a common junction 913 which is connected by means of a resistor 914 to a B+ supply, the common junction 913 forming a single output. As indicated, input 911 is applied to the cathode of diode 915, and input 912 is applied to the cathode of diode 916, the anodes of both diodes 915 and 916 being commonly connected to the output terminal 913. The logical "and" circuit 910 functions typically in that a signal appears on output lead 913 only when signals are applied simultaneously to inputs 911 and 912. Where an additional input is required it may be added to the circuit of Fig. 5 by the addition of an additional diode connected to the common junction point 913 in a manner similar to that of diodes 915 and 916. In order to clearly illustrate the orientation of the input and output leads of a symbolically represented "and" circuit and the typical "and" circuit of Fig. 5, a symbolical representation of an "and" circuit is illustrated in Fig. 5*a*. It should be noted that the inputs and outputs associated with the circuit of Fig. 5 and the symbolically represented logical "and" circuit of Fig. 5*a* are similarly orientated.

Reference is now made to Fig. 6 wherein there is illustrated a typical logical "or" circuit 920 indicated by broken lines and having two inputs 921 and 922 coupled by diodes 924 and 923, respectively, to a common junction 925 which is connected by means of a resistor 926 to ground, the common junction 925 forming the single output. As indicated in the figure, input 921 is applied to the anode of diode 924, and input 922 is applied to the anode of diode 923, the cathodes of both diodes 923 and 924 being commonly connected to the output terminal 925. The logical "or" circuit 920 functions typically in that a signal appears on output lead 925 when a signal is applied to either input 921 or input 922, or both. Where an additional input is required, it may be added to the circuit of Fig. 6 by the addition of an additional diode connected to the common junction point 925 in a manner similar to that of diodes 923 and 924. Again it should be noted that the inputs and outputs associated with the circuits of Fig. 6 and a symbolically represented logical "or" circuit of Fig. 1 are similarly orientated in Fig. 1. In Fig. 8*a* there is presented a symbolic representation of the logical "or" circuit illustrated in Fig. 6, wherein the inputs 921 and 922 and the single output 925 of Fig. 6 is provided with similarly orientated leads in Fig. 6*a*.

The operation and characteristics of the logical "and" circuit 910 of Fig. 5 and the logical "or" circuit 920 of Fig. 6 are fully described in detail in the above-mentioned Wolfe patent, therefore, further explanation of the circuits of Figs. 5 and 6 are not required here.

The operation of the binary sum producing circuits of the embodiment of Fig. 1 will be considered after the binary-coded decimal correction circuits have been considered below; a complete binary-coded decimal summing operation being illustrated wherein the true binary sum *Sb* is formed first and the desired binary-coded decimal sum *Sd* is derived therefrom.

As shown in Fig. 1 the correction circuit includes flip-flops F1 and F2 which are controlled through gating circuits 10F1 and 10F2, respectively. The desired binary-coded decimal sum is obtained through output gating circuit **10*Sd*** which produces a signal series *Sd* corresponding to the binary digits of the decimal sum. It will also be noted that associated with the correction circuit is a flip-flop *Cdm* which receives a modified decimal carry F1 according to the technique introduced in the copending application by E. C. Nelson.

*Table III*

T=1

| | Section (*a*) Binary Sum Digit Values | | | | Section (*b*) Total Weight | Section (*c*) Decimal Carry Digits | | Section (*d*) Decimal Sum Digit Values | | | Section (*e*) | | | | |
|---|---|---|---|---|---|---|---|---|---|---|---|---|---|---|---|
| Digit | $Sb_5$ | $Sb_4$ | $Sb_3$ | $Sb_2$ | ------ | $Cd^2$ | $Cd^1$ | $Sd^4$ | $Sd^3$ | $Sd^2$ | Flip-Flop Input Requirements | | | | Rule |
| Signal | $C^1+C^2$ | $Sb$ | F2 | F1 | ------ | ------ | ------ | F2′ | F1′ | ------ | | | | | |
| Weight | 16 | 8 | 4 | 2 | ------ | 20 | 10 | 8 | 4 | 2 | 1F2 | 0F2 | 1F1 | 0F1 | |
| | 0 | 0 | 0 | 0 | 0 or 1 | 0 | 0 | 0 | 0 | 0 | 0 | ------ | 0 | ------ | 1 |
| | 0 | 0 | 0 | 1 | 2 or 3 | 0 | 0 | 0 | 0 | 1 | 0 | ------ | ------ | 1 | 2 |
| | 0 | 0 | 1 | 0 | 4 or 5 | 0 | 0 | 0 | 1 | 0 | ------ | 1 | 1 | ------ | 3 |
| | 0 | 0 | 1 | 1 | 6 or 7 | 0 | 0 | 0 | 1 | 1 | ------ | 1 | ------ | 0 | 4 |
| | 0 | 1 | 0 | 0 | 8 or 9 | 0 | 0 | 1 | 0 | 0 | 1 | ------ | 0 | ------ | 5 |
| | 0 | 1 | 0 | 1 | 10 or 11 | 0 | 1 | 0 | 0 | 0 | 0 | ------ | ------ | 1 | 6 |
| | 0 | 1 | 1 | 0 | 12 or 13 | 0 | 1 | 0 | 0 | 1 | ------ | 1 | 0 | ------ | 7 |
| | 0 | 1 | 1 | 1 | 14 or 15 | 0 | 1 | 0 | 1 | 0 | ------ | 1 | ------ | 0 | 8 |
| | 1 | 0 | 0 | 0 | 16 or 17 | 0 | 1 | 0 | 1 | 1 | 0 | ------ | 1 | ------ | 9 |
| | 1 | 0 | 0 | 1 | 18 or 19 | 0 | 1 | 1 | 0 | 0 | 1 | ------ | ------ | 1 | 10 |
| | 1 | 0 | 1 | 0 | 20 or 21 | 1 | 0 | 0 | 0 | 0 | ------ | 1 | 0 | ------ | 11 |
| | 1 | 0 | 1 | 1 | 22 or 23 | 1 | 0 | 0 | 0 | 1 | ------ | 1 | ------ | 1 | 12 |
| | 1 | 1 | 0 | 0 | 24 or 25 | 1 | 0 | 0 | 1 | 0 | 0 | ------ | 1 | ------ | 13 |
| | 1 | 1 | 0 | 1 | 26 or 27 | 1 | 0 | 0 | 1 | 1 | 0 | ------ | ------ | 0 | 14 |
| | 1 | 1 | 1 | 0 | 28 or 29 | 1 | 0 | 1 | 0 | 0 | ------ | 0 | 0 | ------ | 15 |

signal through gating circuit 10*Cdm*. The function of flip-flop *Cdm* and the associated gating circuit will be more fully understood after the defining algebraic equations for the decimal correction have been derived.

During the correction time interval, as indicated by a signal T being equal to 1, signals corresponding to the true binary result digits $Sb_4$, $Sb_3$, and $Sb_2$ are registered in flip-flops *Sb*, F2, and F1, respectively. Signals T and $\bar{T}$ are generated externally and applied to the 3-input binary-coded decimal adder of Fig. 1 to control the time of the correction operation of the adder, i.e., to control the time at which the second, third, fourth and fifth true binary sum digits as represented by signals *Sb* are corrected or converted to binary-coded decimal form as represented by binary signals *Sd*. Arithmetic units such as the 3-input adder circuit of Fig. 1 are generally associated with, and usually forms a part of a digital computer. Signals T and $\bar{T}$ are readily available in digital computing devices and are usually generated within the computer by counting circuits responsive to clock pulses thus operating as binary bit or binary digit counters. In the present instance, signals T and $\bar{T}$ are 1 and 0 level signals, respectively, during the correction time interval of the adder of Fig. 1 and have 0 and 1 levels, respectively, at all other times. At this time the fifth binary digit $Sb_5$ is a function of carry signals $C^1$ and $C^2$, and a corresponding signal is produced by gating circuit 10*Sb*. The function $Sb_5$ may be derived from the general expression for $Sb_j$ given above by substituting 0 and 1 for $F_5^{1,3}$ and $\bar{F}_5^{1,3}$ since no binary-coded decimal digit has more than four binary digits. $Sb_5$ may then be expressed as follows:

$$Sb_5=T.(C_3^2.\bar{C}_4^1+\bar{C}_3^2.C_4^1)$$

where the term $C_3^2$ is obtained in the fifth binary position by providing a value of $j=5$ for $C_{j-2}^2$ and where the term $C_4^1$ is obtained in the fifth position by providing a value of $j=5$ for $C_{j-1}^1$.

The corrections which are required are indicated in Table III below wherein all of the possible binary sums are considered with corresponding decimal digit variables. The variables $Sd_2$, $Sd_3$, and $Sd_4$ are the desired second, third, and fourth binary digits of the decimal sum digit and the variables $Cd_j^1$ and $Cd_j^2$ correspond to decimal carries-over-one, and decimal carry-over-two, respectively. It will be noted that digits $Sd^4$ and $Sd^3$ are produced and simultaneously shifted forward into flip-flops F2 and Table III is comprised of five sections, sections (*a*), (*b*), (*c*), (*d*), and (*e*), respectively. Section (*a*), designated generally as "binary sum digit values" includes a second, third, fourth, and fifth binary sum digit column $Sb_2$, $Sb_3$, $Sb_4$, and $Sb_5$, respectively. Section (*b*) includes a "total weight" column indicating the total weight of the binary sum digits of section (*a*) for each row of the table. Section (*c*) is designated as "decimal carry digits" and includes a column for the decimal carry-over-one signals $Cd^1$ and a column for the decimal carry-over-two signals $Cd^2$. Section (*d*) of the table is identified as "decimal sum digit values" and includes a second, third, and fourth decimal result binary digit column $Sd^2$, $Sd^3$, and $Sd^4$, respectively. The last section on the right of the table, section (*c*) identifies the flip-flop input requirements for flip-flops F1 and F2 and includes columns 0F1, 1F1, 0F2, and 1F2. The rows of the table are identified as rule numbers in the extreme right hand column of the table. The digit variables, the digits, and the weights of the variables are indicated at the head of each column of sections (*a*), (*c*), and (*d*).

Table III is constructed in the following manner. All possible combination of variables $Sb_2$, $Sb_3$, $Sb_4$, and $Sb_5$ are entered in the corresponding columns of section (*a*). This is accomplished by the same method utilized for constructing section (*a*) of Table I in that all 0's are entered for rule 1 and the values for each subsequent rule obtained by adding a binary one to the least significant variable of section (*a*), i.e., $Sb_2$. It should be noted that the combination 1, 1, 1, 1, for signals $Sb_2$, $Sb_3$, $Sb_4$, $Sb_5$ is omitted for section (*a*). This is because the maximum possible binary sum obtainable is 29, whereas the above combination would equal a value of 30. The total weights of the binary 1 digits of section (*a*) for each rule are then entered in the corresponding row of section (*b*) of the table. Section (*c*) is then completed by entering a binary 1 under the carry-over-one column $Cd^1$ for each rule having a total weight, as indicated in section (*b*), between 10 and 19; and entering a binary 1 in the carry-over-two column $Cd^2$ for each rule with a total weight between 20 and 29. Section (*d*) of the table is obtained by entering the binary values for digits $Sb_2$, $Sb_3$, and $Sb_4$ in the corresponding rows of columns $Sd^2$, $Sd^3$, and $Sd^4$ of section (*d*) for total weights of 0 to 9, inclusive. For total weight of 10 to 19, inclusive, and for total weights from 20 to 29, inclusive, the same values for $Sd^2$, $Sd^3$, $Sd^4$, as utilized for total weights of 0 to 9 are repeated.

In exactly the same manner as the values for columns 1F1 and 0F1 of section (c) of Table I are determined, the values for columns 1F1, 0F1, 1F2, and 0F2 are obtained for section (c) of Table II. Thus, the values for columns 1F1 and 0F1 are obtained by a comparison of the previous state of flip-flop F1, as indicated by signals F1 of section (a), with the present state of the flip-flop as indicated by signals F1'. Similarly, the previous state of flip-flop F2 is compared with the present state of the flip-flop by examination of signals F2 and F2', respectively, to determine the values for columns 1F2 and 0F2 of section (e).

The input requirements 1F1 and 0F1 of section (c) of Table III are expressed in terms of variables or binary digits $Sb_3$, $Sb_4$, and $Sb_5$ in Table III*a* below, wherein the corresponding rules of Table III are represented on the extreme right hand column of the table, the rules of Table III*a* on the next column to the left, 1F1 and 0F1 columns in the third and fourth columns, respectively, from the left, and the digits or variables $Sb_3$, $Sb_4$, and $Sb_5$ in the third, second, and first column from the right of the table. Under the variables $Sb_3$, $Sb_4$, and $Sb_5$, are the signals F2, *Sb*, and $(C_{j-2}^2.\bar{C}_{j-1}^1+\bar{C}_{j-2}^2.C_{j-1}^1)$, respectively, representing the variables.

The input requirement 1F2 and 0F2 of section (c) of Table III are expressed in Table III*b* below in terms of the digit variables $Sb_2$, $Sb_4$, and $Sb_5$. As in Table III*a*, the corresponding rules of Table III are listed in the extreme right hand column of Table III*b* and values for 0F2 and 1F2 are included in the third and fourth columns from the right hand edge of the table. The $Sb_2$, $Sb_4$, and $Sb_5$ columns appear at the third, second, and first column from the left hand edge of the table.

*Table IIIa*

| Digits | $Sb_5$ | $Sb_4$ | $Sb_3$ | 1F1 | 0F1 | Rule | Rule of Table III |
|---|---|---|---|---|---|---|---|
| Signals | $(C_{j-2}^2.\bar{C}_{j-1}^1+\bar{C}_{j-2}^2.C_{j-1}^1)$ | *Sb* | F2 | | | | |
| | 0 | 0 | 0 | 0 | 1 | 1 | 1 and 2. |
| | 0 | 0 | 1 | 1 | 0 | 2 | 3 and 4. |
| | 0 | 1 | 0 | 0 | 1 | 3 | 5 and 6. |
| | 0 | 1 | 1 | 0 | 0 | 4 | 7 and 8. |
| | 1 | 0 | 0 | 1 | 1 | 5 | 9 and 10. |
| | 1 | 0 | 1 | 0 | 1 | 6 | 11 and 12. |
| | 1 | 1 | 0 | 1 | 0 | 7 | 13 and 14. |
| | 1 | 1 | 1 | 0 | ------ | 8 | 15. |

*Table IIIb*

| Digits | $Sb_5$ | $Sb_4$ | $Sb_2$ | 1F1 | 0F1 | Rule | Rule of Table III |
|---|---|---|---|---|---|---|---|
| Signals | $(C_{j-2}^2.\bar{C}_{j-1}^1+\bar{C}_{j-2}^2.C_{j-1}^1)$ | *Sb* | F1 | | | | |
| | 0 | 0 | 0 | 0 | 1 | 1 | 1 and 3. |
| | 0 | 0 | 1 | 0 | 1 | 2 | 2 and 4. |
| | 0 | 1 | 0 | 1 | 1 | 3 | 5 and 7. |
| | 0 | 1 | 1 | 0 | 1 | 4 | 6 and 8. |
| | 1 | 0 | 0 | 0 | 1 | 5 | 9 and 11. |
| | 1 | 0 | 1 | 1 | 1 | 6 | 10 and 12. |
| | 1 | 1 | 0 | 0 | 0 | 7 | 13 and 15. |
| | 1 | 1 | 1 | 0 | ------ | 8 | 14. |

The desired correction functions may be derived from Table III as indicated in the equations which follow.

$$Cd^1=T.[C^2.\bar{C}^1.Sb.(F^2+F^1)+(C^2+C^1).\overline{Sb}.\bar{F}^2]$$

$$\overline{Cd^1}=\bar{T}+\bar{C}^2.\bar{C}^1.(\overline{Sb}+\bar{F}^2.\bar{F}^1)+(C^2+C^1).(Sb+F^2)$$

$$Cd^2=T.(C^2+C^1).(Sb+F^2)$$

$$Sd^2=F^1.\overline{Cd^1}+\bar{F}^1.Cd^1$$
$$=F^1[\bar{T}+\bar{C}^2.\bar{C}^1.(\overline{Sb}+\bar{F}^2.\bar{F}^1)+(C^2+C^1).(Sb+F^2)]$$
$$+\bar{F}^1.T.[\bar{C}^2.\bar{C}^1.Sb.(F^2+F^1)+(C^2+C^1).\overline{Sb}.\bar{F}^2]$$
$$=\bar{T}.F^1+T.\bar{F}^1.[\bar{C}^2.\bar{C}^1.Sb.F^2+(C^2+C^1).\overline{Sb}.\bar{F}^2]$$
$$+F^1.[\bar{C}^2.\bar{C}^1.\overline{Sb}+(C^2+C^1).(Sb+F^2)]$$
$$=\bar{T}.F^1+T.\bar{F}^1.[\bar{C}^2.\bar{C}^1.Sb.F^2+(C^2+C^1).\overline{Sb}.\bar{F}^2]$$
$$+F^1.[\bar{C}^2.\bar{C}^1.\overline{Sb}+(C^2+C^1).(Sb+F^2)]$$

$$Sd^3=toF1=\bar{T}.F^2+\bar{C}^2.\bar{C}^1.F^2.(\overline{Sb}+F^1)$$
$$+T.(C^2+C^1).\bar{F}^2.(Sb+\bar{F}^1)$$
$$1F1=T.\bar{F}^2.(C^2+C^1)+F^2.\bar{C}^2.\bar{C}^1.\overline{Sb}+\bar{T}.F^2$$
$$0F1=T.\bar{F}^2.(\overline{Sb}+\bar{C}^1.\bar{C}^2)+T.F^2.\overline{Sb}.(C^1+C^2)+\bar{T}.\bar{F}^2$$
$$Sd^4=toF2=\bar{F}^2.[\bar{C}^2.\bar{C}^1.Sb.\bar{F}^1+T.(C^2+C^1).\overline{Sb}.F^1]$$
$$F^2.(C^2+C^1).Sb.\bar{F}^1+\bar{T}.Sb$$
$$1F2=\bar{C}^2.\bar{C}^1.Sb.\bar{F}^1+(C^2+C^1).\overline{Sb}.F^1+\bar{T}.Sb$$
$$0F2=T.(\bar{C}^2.\bar{C}^1+F^1)+Sb$$

The manner of deriving the above logical equations is similar to the method explained above in relation to the equations derived from Table I. As an illustration, consider the $Cd^1$ column of section (c) of Table III above. $Cd^1$ has a 1 value for rules 6 to 10, inclusive, and a 0 value at all other times. In terms of the variables of section (a) of the table, $Sb_4$ is 1 and $Sb_5$ is 0 for rules 5 to 8, inclusive. Rule 5, however, is unique in that both $Sb_2$ and $Sb_3$ are 0 in value. Thus, the function $$Cd^1=Sb_4.\bar{S}b_5(Sb_3+Sb_2)$$

will satisfy rules 6, 7, and 8. $Sb_4$ is 0 and $Sb_5$ is 1 for rules 9 to 15, inclusive. However, only rules 9 and 10 have the combination $\bar{S}b_3.\bar{S}b_4.Sb_5$; thus, the function $Cd^1=\bar{S}b_3.\bar{S}b_4.Sb_5$ satisfies rules 9 and 10. By logically adding the two above discussed functions for $Cd^1$, the functions $Cd^1=Sb_4.\bar{S}b_5(Sb_3+Sb_2)+\bar{S}b_3.\bar{S}b_4.Sb_5$ is obtained. Substituting the corresponding signals for the variables in the above expression, the result becomes:

$$Cd^1=Sb.(\overline{C^1+C^2}).(F1+F2)+\bar{F}2.\bar{S}b.(C^1+C^2)$$

By well-known principles of Boolean algebra, the above expression reduces to $$Cd^1=Sb.\bar{C}^1.\bar{C}^2.(F1+F2)+\bar{S}b.\bar{F}2(C^1+C^2)$$

which, if the time signal T is added, agrees with the equation for $Cd^1$ above.

In the same manner, the functions for 1F1, 0F1, and 1F2, 0F2 were derived from Tables III*a* and III*b*, respectively, reiteration of the step-by-step procedure being deemed unnecessary at this point.

It will be noted that during the correction time interval $(T=1)$ gating circuit 10*Sb* already produces the digit $Sb_5$ so that an additional correction must be performed in order to introduce the decimal carry signal $Cd^1$ into the function for $Sb_5$. In a similar manner, it is necessary to modify the binary digit $Sb_6$ so that it includes the decimal carry $Cd^2$. In the embodiment of Figure 1 this is done by forming a modified decimal carry signal $Cd^m$ which is 1 whenever the true binary carry signals $C^2$ and $C^1$ represent a carry which is less, by 1, than the desired decimal carry. Thus, $Cd^m$ is 1 for numbers 10 through 15 since no binary carries are formed and a decimal carry of 1 is required. A similar situation arises for numbers 20 through 29 since a digit $Sb_5$ is formed (indicating that the function $C^2.\bar{C}^1+\bar{C}^2.C^1$ is 1), but a decimal carry of 2 (10 in binary notation) is required. The variable $Cd^m$ therefore is a decimal carry which may be added to the next binary-coded decimal digit series in order to correct for situations where the true binary carries are lacking in carry-over by 1.

Reference to Table III indicates that the signal $Cd^m$ may be defined as follows:

$$Cd^m=T.[Sb.(F^2+F^1)+(C^2+C^1).(Sb+F^2)]$$

The signal $Cd^m$ may then be added to the signal series produced by flip-flop *Sb* by entering this signal as an initial carry into flip-flop *Cdm* through gating circuit 10*Cdm*, as shown in Fig. 1. Since flip-flop *Cdm* must remain 1, indicating a carry, as long as signal *Sb* is 1 the "setting" function for flip-flop *Cdm* is defined so that the flip-flop is set to 1 by the function for $Cd^m$ and remains 1 as long as *Sb* continues to be 1. The gating function for circuit 10*Cdm* may thus be defined as follows:

$$(10Cdm)\quad toCdm=T.[Sb.(F^2+F^1)+(C^2+C^1).(Sb+F^2)]+C^{dm}.Sb$$

where the signal $C^{dm}$ is the output signal of flip-flop *Cdm* and is equal to the variable *Cd* after the correction time interval $(T=1)$, but becomes a carry signal for the remainder of the period if *Sb* remains 1.

The true binary sum is then modified to include the decimal carry signal $C^{dm}$ as follows:

$$Sb^m=C^{dm}.\overline{Sb}+\overline{C}^{dm}.Sb$$

$$Sb^m=C^{dm}.Sb+\overline{C}^{dm}.\overline{Sb}$$

A complete set of equations defining the embodiment of Fig. 1 may then be written as follows:

$$toF(1,3)=A.\overline{B}.\overline{X}+\overline{A}.B.\overline{X}+\overline{A}.\overline{B}.X+A.B.X$$

$$1F(2,3)=(A.B+A.X+B.X).Cp$$

$$0F(2,3)=(\overline{A}.\overline{B}+\overline{A}.\overline{X}+\overline{B}.\overline{X}).Cp$$

$$(10C1)\begin{cases}1C1=[F_j^{2,3}.(\overline{C}_{j-2}^2+\overline{F}_j^{1,3})+C_{j-2}^2.\overline{F}_j^{2,3}.F_j^{1,3}].Cp\\0C1=[F_j^{2,3}.(C_{j-2}^2+F_j^{1,3})+\overline{C}_{j-2}^2.\overline{F}_j^{2,3}.\overline{F}_j^{1,3}].Cp\end{cases}$$

$$(10C2)\begin{cases}1C2=F_{j-1}^{2,3}.\overline{C}_{j-1}^1.Cp\\0C2=(\overline{F}_{j-1}^{2,3}+C_{j-1}^1).Cp\end{cases}$$

$$(10Sb)\quad toSb=[\overline{F}_j^{1,3}.(C_{j-2}^2.\overline{C}_{j-1}^1+\overline{C}_{j-2}^2.C_{j-1}^1)+F_j^{1,3}.(C_{j-2}^2.C_{j-1}^1+\overline{C}_{j-2}^2.\overline{C}_{j-1}^1)].Cp$$

$$(10Sd)\quad Sd=\overline{T}.F^1+T.\overline{F}^1.\overline{C}^2.\overline{C}^1.Sb^m.F^2+T.\overline{F}^1.(C^2+C^1).\overline{Sb}^m.\overline{F}^2+F^1.\overline{C}^2.\overline{C}^1.\overline{Sb}^m+F^1.(C^2+C^1).(Sb^m+F^2)$$

$$(10F1)\quad toF1=[\overline{T}.F^2+\overline{C}^2.\overline{C}^1.F^2.(\overline{Sb}^m+F^1)+T.(C^2+C^1).\overline{F}^2.(Sb^m+\overline{F}^1)].Cp$$

$$(10F2)\begin{cases}1F2=[\overline{T}.F^1+T.\overline{C}^2.\overline{C}^1.Sb^m.\overline{F}^1+(C^2+C^1).\overline{Sb}^m.F^1].Cp\\0F^2=[\overline{T}.\overline{F}^1+T.(\overline{C}^2.\overline{C}^1+\overline{Sb}^m+F^1)].Cp;\\\text{where }Sb^m=C^{dm}.\overline{Sb}+\overline{C}^{dm}.Sb\\\overline{Sb}^m=C^{dm}.Sb+\overline{C}^{dm}.\overline{Sb}\end{cases}$$

$$(10Cdm)\quad toCdm=[T.Sb.(F^2+F^1)+(C^2+C^1).(Sb+F^2)+C^{dm}.Sb].Cp$$

A typical operation of the embodiment of Fig. 1 is illustrated in Table IV illustrating the addition of binary-coded decimal numbers 1097, 574, and 935. The signal T is shown indicating the digits which are available during the correction time interval.

*Table IV*

| | | | | | | | | | | | | | | |
|---|---|---|---|---|---|---|---|---|---|---|---|---|---|---|
| | 1 | 0 | 0 | 0 | 1 | 0 | 0 | 0 | 1 | 0 | 0 | 0 | 1 | T. |
| | 1 | 0 | 0 | 0 | 0 | 1 | 0 | 0 | 1 | 0 | 1 | 1 | 1 | A=1,097. |
| | | 0 | 1 | 0 | 1 | 0 | 1 | 1 | 1 | 0 | 1 | 0 | 0 | B=574. |
| | | 1 | 0 | 0 | 1 | 0 | 0 | 1 | 1 | 0 | 1 | 0 | 1 | C=935. |
| | 1 | 1 | 1 | 0 | 0 | 1 | 1 | 0 | 1 | 0 | 1 | 1 | 0 | $F_j^{1,3}$. |
| | 0 | 0 | 0 | 1 | 0 | 0 | 1 | 1 | 0 | 1 | 0 | 1 | | $F_{j-1}^{2,3}$. |
| | 0 | 0 | 0 | 1 | 1 | 1 | 1 | 0 | 0 | 0 | 1 | 1 | | $C_{j-1}^1$. |
| | 0 | 0 | 0 | 0 | 0 | 0 | 1 | 0 | 1 | 0 | 0 | | | $C_{j-2}^2$. |
| 0 | 1 | 1 | 1 | 1 | 1 | 0 | 1 | 0 | 0 | 0 | 0 | 0 | 0 | *Sb*. |
| 1 | 1 | 1 | 1 | 1 | 1 | 0 | 0 | 0 | 0 | 0 | 0 | 0 | 0 | $C^{dm}$. |
| 1 | 0 | 0 | 0 | 0 | 0 | 0 | 1 | 0 | 0 | 0 | 0 | 0 | 0 | $Sb^m$. |
| 1 | 0 | 0 | 1 | 1 | 0 | 0 | 0 | 0 | 0 | 0 | 1 | 1 | 0 | *Sd*=2606. |

In analyzing Table IV it will be noted that the signals $C_{j-2}^2$, $C_{j-1}^1$, and $F_{j-1}^{2,3}$ never assume the combinations: 101 or 110 since whenever signal $C_{j-2}^2$ is 1 the previous carry-over-one signal $C_{j-2}^1$ is 0 and $F_{j-2}^{2,3}$ is 1. As a result, any carry formed ($C_{j-1}^1$) at that time is equal to the signal $F_{j-1}^{2,3}$ or the carry resulting from the presence of two or three input signals. The signal $Sb^m$ is introduced in order to indicate the effect of the addition of the decimal correction signals $C^{dm}$. It will be noted that the decimal digits *Sd* are shown as being produced directly from the $Sb^m$ digits without delay. In the actual circuit, it will be understood, signals *Sd* are delayed three digit time intervals through the correction circuit.

It will be noted that the defining algebraic equations considered above have been written in various forms, illustrating the fact that the generic concepts herein considered are independent of the particular associated set of equations. Thus, "setting," "changing," and "simplified partial-changing" flip-flop functions may be utilized interchangeably without departing from the invention. It will also be understood that the type of storage device utilized, whether flip-flop or trigger circuits, is generally immaterial. Trigger circuits F(1,3) and F(2,3)*j*, for example, may be replaced with flip-flop circuits, introducing a binary digit delay in the adder operation.

At attempt has been made to point out a few of the important variations in the correction methods and methods of obtaining the arithmetic combination of at least three input numbers. As used in the specification and in the claims, the term "arithmetic" is intended to cover mathematical operations such as addition and subtraction which are capable of being completed in a single cycle of computation rather than in a plurality of cycles of computation such as for multiplication and division. These arithmetic operations produce a binary result R*b* which corresponds to the binary sum S*b* in Figure 1 and to the equation (10S*b*) set forth above. The arithmetic operations also produce a binary-coded decimal result R*d* which corresponds to the binary-coded decimal sum S*d* in Figure 1 and to the equation (10S*d*) set forth above.

It will be understood, however, that each of the variations mentioned in the previous paragraph as well as those apparent to a person skilled in the art leads to a multitude of others which may be considered to be of the same general class. Because of this, the invention may be defined in general terms.

What is claimed as new is:

1. A multiple input arithmetic unit for performing an arithmetic operation capable of being completed in a single cycle of computation and for performing such arithmetic operation upon N binary-coded decimal input numbers where N is an integer greater than 2 and for performing such arithmetic operation to form a binary-coded decimal result, the input numbers being represented by N corresponding electrical input signal series and the binary-coded decimal result being represented by an electrical output signal series, respectively; said arithmetic unit including: first means responsive to the N input signal series for producing first series of signals indicating the results of the arithmetic combination of the binary signals in each corresponding binary position of the N input signal series; second means coupled to the first means and responsive for each binary position to the first series of signals and to the signals produced by the second means for producing a second series of signals indicating the carries resulting from the arithmetic combination of the binary signals in successive binary positions and the binary carry signals from preceding binary positions; third means coupled to the first and second means and responsive to the first and second series of signals for producing a third series of signals indicating the true binary result of the combination of the N input numbers in each binary position and the carry of the arithmetic combinations from the preceding binary positions; and correction circuit means coupled to the first, second and third means and responsive to the first, second and third series of signals for producing the output signal series to represent the mathematical combination of the input numbers in binary-coded decimal form.

2. The arithmetic unit defined in claim 1 wherein the first means includes first gating circuit means responsive to the input signal series for a value of $N=3$ to produce first binary control signals indicating when first pluralities of the N input signals have a particular binary value for each binary position and wherein the first means also includes second gating circuit means responsive to the input signal series for a value of $N=3$ to produce second binary control signals indicating when second pluralities of the N input signals have the particular binary value for each binary position.

3. The arithmetic unit defined in claim 1 wherein said first means includes first gating circuit means responsive to the input signal series for a value of $N=3$ to produce, in the first series of signals, first binary control signals indicating when first particular pluralities of the binary input signals have a particular binary value and wherein the first means also includes second gating circuit means responsive to the input signal series for a value of $N=3$ to produce, in the first series of signals, second binary control signals indicating when second particular pluralities of the input signals have the particular binary value and wherein the second means is constructed to provide binary carry-over-one signals indicating a binary carry of one from a first binary position to the next binary position and to provide binary carry-over-two signals indicating a binary carry of one from a first binary position to a third binary position two positions higher in digital significance than the first binary position and wherein the second means includes first circuit means responsive to the first and second binary control signals for producing in each binary position the binary carry-over-one signals in a pattern dependent upon the occurrence of the first and second binary control signals and the binary carry-over-one signals from the first preceding binary position and dependent upon the binary carry-over-two signals from the second preceding binary position and wherein the second means includes second circuit means responsive to the first signals from the first circuit means and responsive to the binary-carry-over-one signals for producing in each binary position the binary carry-over-two signals in a pattern dependent upon the occurrence of the second binary control signals and upon the binary carry-over-one signals from the first preceding binary position.

4. The arithmetic unit defined in claim 3 wherein said third means includes a binary result-producing network responsive to the binary carry-over-one signals and to the binary carry-over-two signals and to the first binary control signals and the second binary control signals for combining these signals in a particular relationship to produce the third series of signals indicating the true binary result of the arithmetic operation.

5. The arithmetic unit defined in claim 4 wherein the binary-coded decimal correction circuit means includes first gating circuit means responsive in each binary position to the third series of signals and responsive to the first and second binary control signals and to the binary carry-over-one signals from the first preceding binary position and responsive to the binary carry-over-two signals from the second preceding binary position for combining these signals in a particular relationship to produce the output signal series representing in binary-coded decimal form the arithmetic combination of the input numbers.

6. An arithmetic unit for performing an arithmetic operation capable of being completed in a single cycle of computation and for performing such arithmetic operation upon at least three binary-coded decimal input numbers to form the corresponding binary-coded decimal result, the input numbers being represented by electrical input signal series $A_j$, $B_j$ and $X_j$, $j$ indicating the binary digit position, and the binary-coded decimal result of the operation being represented by signal series $Rd$; said arithmetic unit including first means responsive to the input signal series $A_j$, $B_j$ and $X_j$ for producing first and second series of signals and indicating, respectively, the presence of first pluralities of signals having a particular binary value in the binary position $j$ and the presence of second pluralities of signals having the particular binary value in the binary position $j$; second means coupled to said first means and responsive to the first and second signal series and responsive to the signals produced by the second means in particular positions having a digital significance less than the position $j$ for producing a third series of signals to indicate in each binary position $j$ the binary carries resulting from the arithmetic combination of the signal series $A_j$, $B_j$ and $X_j$ in each binary position $j$ and the carry signals in particular positions having a digital significance less than the position $j$; and third means coupled to the first and second means and responsive to the first, second and third series of signals for producing a fourth series of signals indicating the true binary result $Rb_j$ of the arithmetic combination of the signal series $A_j$, $B_j$ and $X_j$; and correction circuit means coupled to the first, second and third means and responsive to the first, second, third and fourth series of signals for producing the signal series $Rd$.

7. The arithmetic unit defined in claim 6 wherein the first means are responsive to the input signal series $A_j$, $B_j$ and $X_j$ in a particular relationship to produce signals $F_j^{1,3}$ and $F_j^{2,3}$ in accordance with the logical equations $$F_j^{1,3}=A_j.\bar{B}_j.\bar{X}_j+\bar{A}_j.B_j.\bar{X}_j+\bar{A}_j.\bar{B}_j.X_j+A_j.B_j.X_j$$

$$F_j^{2,3}=A_j.B_j+A_j.X_j+B_j.X_j$$

where the dot (.) represents an "and" relationship and the plus (+) sign represents an "or" relationship and where the bar (‾) over a term indicates a complementary state of operation and where the signals $F_j^{1,3}$ represent the first series of signals and indicate the occurrence of one or three binary signals $A_j$, $B_j$ and $X_j$ with a binary value of 1 in the binary position $j$ and where the signals $F_j^{2,3}$ represent the second series of signals and indicate the occurrence of two or three binary signals $A_j$, $B_j$ and $X_j$ with a binary value of 1 in the binary position $j$.

8. The arithmetic unit defined in claim 7 wherein a flip-flop C1 is included in the second means to indicate binary carry-over-one signals $C_j^1$ and wherein said second means are constructed to produce the binary carry-over-one signals $C_j^1$ in the C1 flip-flop in each binary position $j$ in a pattern dependent upon the occurrence of the signal series $F_j^{1,3}$ and $F_j^{2,3}$ in the binary position $j$ and dependent upon the binary carry-over-one signals $C_{j-1}^1$ produced in the position $(j-1)$ of immediately less digital significance than the binary position $j$ and wherein such second means are constructed to produce binary carry-over-two signals $C_j^2$ in each binary position and wherein such second means are constructed to produce the binary carry-over-one signals $C_j^1$ in accordance with the logical equations $$1C1=[F_j^{2,3}(\bar{C}_{j-2}^2+\bar{F}_j^{1,3})+C_{j-2}^2.\bar{F}_j^{2,3}.F_j^{1,3}].Cp$$

$$0C1=[F_j^{2,3}.(C_{j-2}^2+F_j^{1,3})+\bar{C}_{j-2}^2.\bar{F}_j^{2,3}.\bar{F}_j^{1,3}].Cp$$

where the signal $Cp$ represents a clock signal and where the signals 1C1 and 0C1 represent input signals to the input terminals of the flip-flop C1 included in the second means to respectively obtain the production of signals $C_j^1$ and $\bar{C}_j^1$ and where the signals $C_{j-2}^2$ and $\bar{C}_{j-2}^2$ represent the binary carry-over-two signals produced in the binary position $(j-2)$ of immediately less digital significance than the binary position $(j-1)$.

9. The arithmetic unit defined in claim 8 wherein a flip-flop C2 is included in the second means to indicate binary carry-over-two signals $C_j^2$ and wherein the second means are constructed to produce the binary carry-over-two signals $C_j^2$ in the C2 flip-flop in a pattern dependent upon the occurrence of the signal series F2,3 and $C_j^1$ and in accordance with the logical equations:

$$1C2=F_{j-1}^{2,3}.\bar{C}_{j-1}^{1}.Cp$$

$$0C2=(\bar{F}_{j-1}^{2,3}+C_{j-1}^{1}).Cp$$

where the signals $C_j^2$ represent a binary carry of one from each binary position $j$ to the binary position having a digital significance of 2 binary positions greater than the position $j$ and where the signals 1C2 and 0C2 represent input signals to the input terminals of the flip-flop C2 included in the second means to respectively obtain the production of signals $C_j^2$ and $\bar{C}_j^2$ and where the signals $C_{j-1}^1$ and $\bar{C}_{j-1}^1$ represent the binary-carry-over-one signals produced in the binary position $(j-1)$ of immediately less digital significance than the binary position $j$.

10. The arithmetic unit defined in claim 9 wherein a flip-flop R$b$ is included in the third means to indicate the signal series R$b$ and wherein the third means includes a binary result-producing network for producing the signal series R$b$ in the R$b$ flip-flop, said binary result producing network being constructed to produce the signals R$b$ in accordance with the logical equations:

$$toRb=\bar{F}_j^{1,3}.(C_{j-1}^1.\bar{C}_{j-2}^2+\bar{C}_{j-1}^1.C_{j-2}^2)$$
$$+F_j^{1,3}.(C_{j-1}^1.C_{j-2}^2+\bar{C}_{j-1}^1.\bar{C}_{j-2}^2).Cp$$

where the signals *to*R$b$ represent input signals to an input terminal of a flip-flop R$b$ for triggering and maintaining the flip-flop R$b$ in a state for obtaining the production of a signal R$b$.

11. The arithmetic unit defined in claim 10 wherein said correction circuit means includes first and second correction flip-flops F1 and F2 producing complementary output signals $F^1$, $\bar{F}^1$ and $F^2$, $\bar{F}^2$, and having input circuits 1F1, 0F1; and 1F2, 0F2, respectively, said correction circuit means also including first electrical gating circuits responsive to signals $F^1$ and $\bar{F}^1$ for producing said signal series $Sd$, second electrical gating circuits interconnecting said correction flip-flops, and third electrical gating circuits connected to said second correction flip-flop to provide input signals to the input circuits of said second correction flip-flop.

12. The arithmetic unit defined in claim 11 wherein all binary-coded decimal corrections are performed during correction time intervals represented by pluralities of clock pulses $Cp$ and wherein signals T are produced during particular clock pulses of each correction time intervals and wherein signals $\bar{T}$ are produced during the other clock signals of each correction time interval to obtain a repetitive pattern for the production of the signals T and $\bar{T}$, the signals $\bar{T}$ representing the complement of the signals T, and wherein said correction circuit means further includes carry correction means and a carry correction flip-flop $Cdm$ for producing decimal carry signals $Cd^m$ and $\bar{C}d^m$, the signals $\bar{C}^{dm}$ representing the complement of the signals $C^{dm}$, and wherein the carry correction means and the carry correction flip-flops are constructed to produce signals in the carry correction flip-flop *Cdm* in accordance with the logical equations:

$$ToCdm=T.[Sb.(F^2+F^1)+(C_{j-2}^2+C_{j-1}^1).(Sb+F^2)$$
$$+C^{dm}.Sb].Cp$$

where the representation *to*C$dm$ indicates that the carry correction flip-flop is triggered or maintained in a state for the production of the signal $Cd^m$ and wherein the correction circuit means further includes means constructed to produce signals $Sb^m$ and $\bar{S}b^m$ representing a modified result of the true binary sum in accordance with the logical equations:

$$Sb^m=C^{dm}.\overline{Sb}+\bar{C}^{dm}.Sb$$

$$\bar{S}b^m=C^{dm}.Sb+\bar{C}^{dm}.\bar{S}b$$

13. The arithmetic unit defined in claim 12 wherein the correction circuit means further includes gating circuits constructed to produce signals in accordance with the logical equations:

$$Sd=\bar{T}.F^1+T.\bar{F}^1.\bar{C}^2.\bar{C}^1.Sb^m.F^2+T.\bar{F}^1.(C^2+C^1).\bar{S}b^m.\bar{F}^2$$
$$+F^1.\bar{C}^2.\bar{C}^1.\bar{S}b^m+F^1.(C^2+C^1).(Sb^m+F^2)$$

$$toF1=[\bar{T}.F^2+\bar{C}^2.\bar{C}^1.F^2.(\bar{S}b^m+F^1)$$
$$+T.(C^2+C^1).\bar{F}^2.(Sb^m+\bar{F}^1)].Cp$$

$$1F2=[\bar{T}.F^1+T.\bar{C}^2.\bar{C}^1.Sb^m.\bar{F}^1+(C^2+C^1).\bar{S}b^m.F^1].Cp$$

$$0F2=[\bar{T}.\bar{F}^1+T.(\bar{C}^2.\bar{C}^1+\bar{S}b^m+F^1)].Cp$$

where the signals 1F2 and 0F2 are respectively introduced to the input circuits of the flip-flop F2 to obtain the production of the signals $F^2$ and $\bar{F}^2$, the signals $\bar{F}^2$ representing the complement of the signals $F^2$ and where the representation *to*F1 indicates signals introduced to the flip-flop F1 for triggering and maintaining the flip-flop F1 in the $F^1$ state, the signal $\bar{F}1$ representing the complement of the signals F1, and where the signals $Sd$ indicate the values in successive binary positions of the binary-coded decimal result and where the first electrical gating circuit in the correction circuit means are constructed to produce the signals $Sd$ and where the third electrical gating circuits in the correction circuit means are constructed to produce the signals 1F2 and 0F2 for introduction to the input circuits of the flip-flop F2 and where the second electrical gating circuits in the correction circuit means are constructed to control the introduction of input signals to the input circuits of the flip-flop F1.

References Cited in the file of this patent

FOREIGN PATENTS 678,427 Great Britain ............ Sept. 3, 1952

OTHER REFERENCES

High Speed Computing Devices by Engineering Research Associates, McGraw-Hill, 1950, pages 289–293.

UNITED STATES PATENT OFFICE

Certificate of Correction

Patent No. 2,923,474 February 2, 1960

John Virgil Blankenbaker

It is hereby certified that error appears in the printed specification of the above numbered patent requiring correction and that the said Letters Patent should read as corrected below.

Column 15, line 21, for "An" read —Any—; column 17, line 17, the equation should appear as shown below instead of as in the patent:

$$toSb=[\overline{F}_j^{1,3}\cdot(C_{j-2}^2\cdot\overline{C}_{j-1}^1+\overline{C}_{j-2}^2\cdot C_{j-1}^1)+$$

column 21, Table IIIb, the fifth and sixth vertical columns should be headed, respectively, —1F2—, and —0F2—, instead of as in the patent; line 64, the equation should appear as shown below instead of as in the patent:

$$Cd^1=T.[\overline{C}^2.\overline{C}^1.Sb.(F^2+F^1)+(C^2+C^1).\overline{Sb}.\overline{F}^2]$$

column 22, line 7, before the equation beginning with "$F^2$." insert a — + —; line 24, the equation should appear as shown below instead of as in the patent:

$$\overline{S}b_3.\overline{S}b_4.Sb_5$$

column 23, line 13, the equation should appear as shown below instead of as in the patent:

$$\overline{\overline{Sb}}^m=C^{dm}.Sb+\overline{C}^{dm}.\overline{Sb}$$

line 43, the equation should appear as shown below instead of as in the patent:

$$0F2=[\overline{T}.\overline{F}^1+T.(\overline{C}^2.\overline{C}^1+\overline{Sb}^m+F^1)].Cp$$

Signed and sealed this 26th day of July 1960.

[SEAL]

Attest:

KARL H. AXLINE,
*Attesting Officer.*

ROBERT C. WATSON,
*Commissioner of Patents.*